(12) United States Patent
Xu et al.

(10) Patent No.: US 11,696,041 B2
(45) Date of Patent: Jul. 4, 2023

(54) IMAGE SENSOR, CONTROL METHOD, CAMERA COMPONENT AND MOBILE TERMINAL WITH RAISED EVENT ADAPTABILITY AND PHASE DETECTION AUTO FOCUS

(71) Applicant: GUANGDONG OPPO MOBILE TELECOMMUNICATIONS CORP., LTD., Dongguan (CN)

(72) Inventors: Rui Xu, Dongguan (CN); Cheng Tang, Dongguan (CN); Xin Yang, Dongguan (CN); Xiaotao Li, Dongguan (CN); Wentao Wang, Dongguan (CN); Jianbo Sun, Dongguan (CN); He Lan, Dongguan (CN); Haiyu Zhang, Dongguan (CN); Gong Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/747,907

(22) Filed: May 18, 2022

(65) Prior Publication Data

US 2022/0279150 A1 Sep. 1, 2022

Related U.S. Application Data

(63) Continuation of application No. PCT/CN2019/121697, filed on Nov. 28, 2019.

(51) Int. Cl.
*H04N 23/84* (2023.01)
*H04N 25/589* (2023.01)
(Continued)

(52) U.S. Cl.
CPC .......... *H04N 23/84* (2023.01); *H04N 25/589* (2023.01); *H04N 25/702* (2023.01); *H04N 25/704* (2023.01)

(58) Field of Classification Search
CPC ...... H04N 23/80; H04N 23/84; H04N 25/134; H04N 25/63; H04N 25/683; H04N 23/672;
(Continued)

(56) References Cited

U.S. PATENT DOCUMENTS 10,313,579 B2 6/2019 Kadambala et al.
2012/0293706 A1 11/2012 Usui
(Continued)

FOREIGN PATENT DOCUMENTS

CN 107146797 A 9/2017
CN 107395990 A 11/2017
(Continued)

OTHER PUBLICATIONS

International Search Report and the Written Opinion dated May 28, 2020 From the International Searching Authority Re. Application No. PCT/CN2019/121697, 11 pages.

*Primary Examiner* — Gevell V Selby
(74) *Attorney, Agent, or Firm* — Bayes PLLC

(57) ABSTRACT

An image sensor includes a two-dimensional pixel array and a lens array. The two-dimensional pixel array comprises a plurality of pixels. Some of the pixels includes two sub-pixels. A rectangular coordinate is established by taking the pixel as an origin, a length direction of the two-dimensional pixel array as an x-axis, and a width direction of the two-dimensional pixel array as a y-axis. The two sub-pixels lie in both a positive half axis and a negative half axis of the x-axis and lies in both a positive half axis and a negative half
(Continued)

axis of the y-axis. The lens array comprises a plurality of lenses, each covering one of the pixels.

20 Claims, 19 Drawing Sheets

(51) Int. Cl.
*H04N 25/702* (2023.01)
*H04N 25/704* (2023.01)

(58) Field of Classification Search
CPC ..... H04N 17/002; G06T 5/001; G06T 7/0002; G06T 7/337; G06T 2207/20172; G06T 2207/30168; G06T 7/0004
See application file for complete search history.

(56) References Cited

U.S. PATENT DOCUMENTS

| 2015/0350583 | A1* | 12/2015 | Mauritzson | H04N 25/70 |
| | | | | 257/432 |
| 2016/0156867 | A1* | 6/2016 | Fukuda | H04N 23/667 |
| | | | | 348/302 |
| 2020/0059592 | A1* | 2/2020 | Zeng | H01L 27/14627 |
| 2021/0195124 | A1* | 6/2021 | Azami | H04N 23/10 |
| 2021/0358993 | A1* | 11/2021 | Mao | H04N 25/133 |

FOREIGN PATENT DOCUMENTS

| CN | 208062054 U | 11/2018 |
| CN | 109922270 A | 6/2019 |
| CN | 109981939 A | 7/2019 |

\* cited by examiner

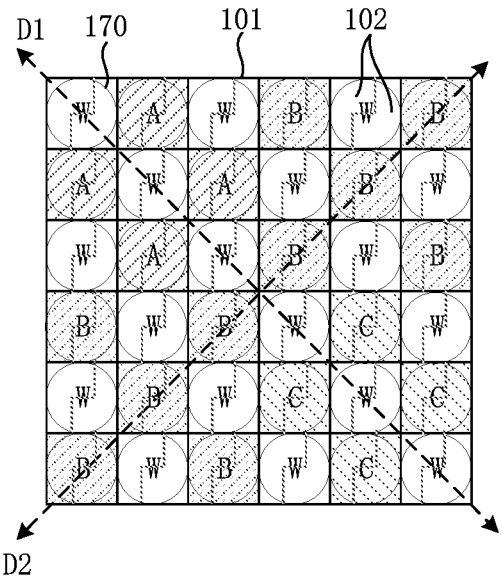
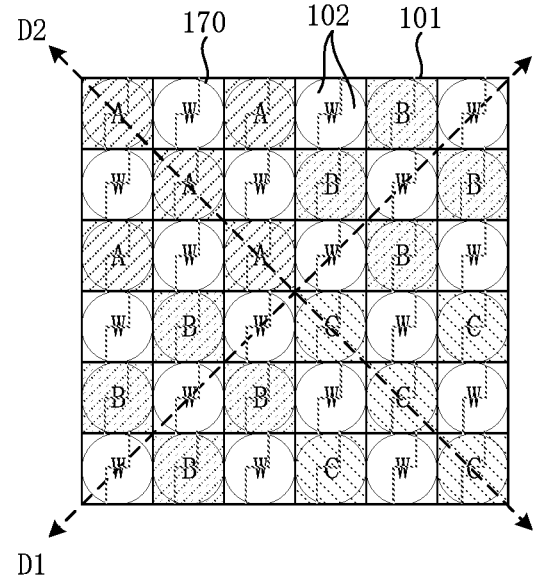
Fig. 16       Fig. 17
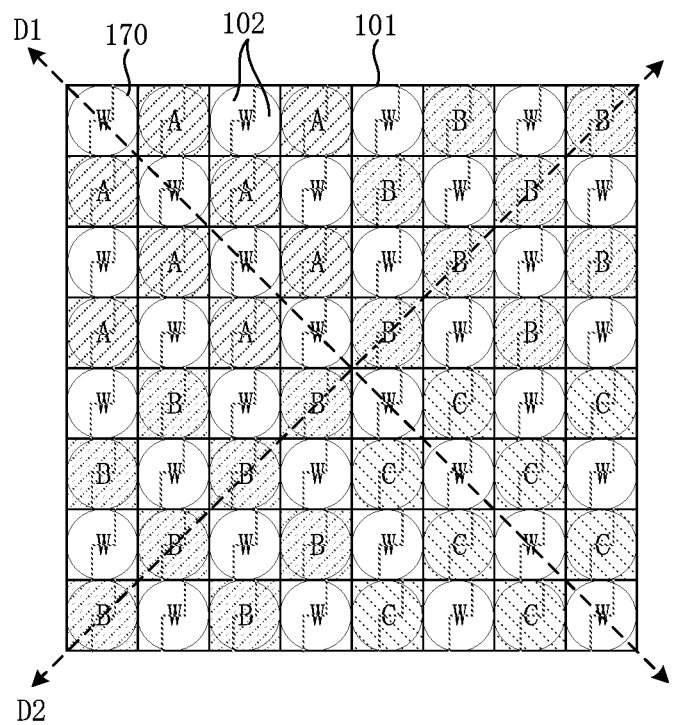
Fig. 18

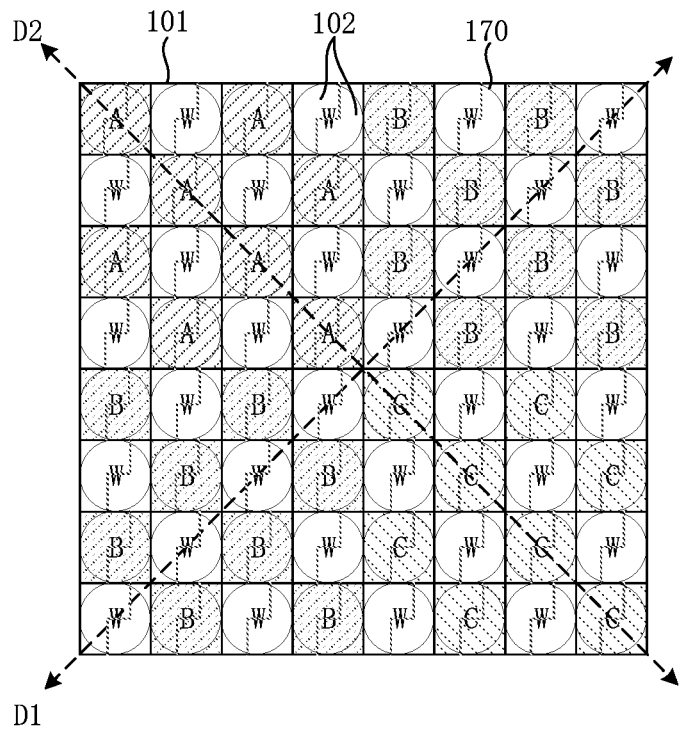
Fig. 19
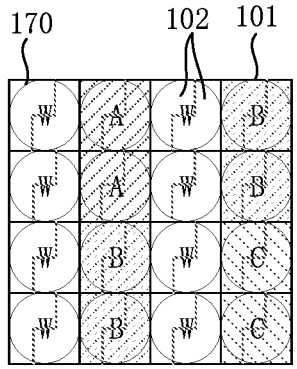
Fig. 20
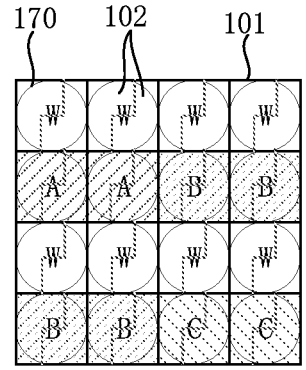
Fig. 21
A plurality of sub-pixels are exposed to output sub-pixel information. — 01
Calculate a phase difference according to the sub-pixel information to perform a focus process. — 02
In the in-focus condition, a plurality of pixels of the 2D pixel array are exposed to obtain a target image. — 03
Fig. 22

IMAGE SENSOR, CONTROL METHOD, CAMERA COMPONENT AND MOBILE TERMINAL WITH RAISED EVENT ADAPTABILITY AND PHASE DETECTION AUTO FOCUS

CROSS REFERENCE OF RELATED APPLICATIONS

This application is a continuation application of an International Application No. PCT/CN2019/121697, filed on Nov. 28, 2019, the contents of which is incorporated herein by reference in its entirety.

FIELD OF THE DISCLOSURE

The present disclosure relates to an image technology, and more particularly, to an image sensor, a control method, a camera component and a mobile terminal.

BACKGROUND

Conventionally, the phase detection auto focus is often implemented by the following two methods: (1) implementing multiple pairs of phase detection pixels in the pixel array to detect a phase difference, where each pair of the phase detection pixels has a pixel with its right half blocked and another pixel with its left half blocked; (2) Each pixel comprises two photo diodes, which constitute a phase detection pixel to detect the phase difference.

SUMMARY

One objective of an embodiment of the present disclosure is to provide an image sensor, a control method, a camera component and a mobile terminal.

According to an embodiment of the present disclosure, an image sensor is disclosed. The image sensor comprises a two-dimensional pixel array and a lens array. The two-dimensional pixel array comprises a plurality of pixels. Part of the pixels comprises two sub-pixels. A rectangular coordinate is established by taking the pixel as an origin, a length direction of the two-dimensional pixel array as an x-axis, and a width direction of the two-dimensional pixel array as a y-axis. The two sub-pixels lie in both a positive half axis and a negative half axis of the x-axis and lies in both a positive half axis and a negative half axis of the y-axis. The lens array comprises a plurality of lenses, each covering one of the pixels.

According to an embodiment of the present disclosure, a control method used in an image sensor is disclosed. The image sensor comprises a two-dimensional pixel array and a lens array. The two-dimensional pixel array comprises a plurality of pixels. Part of the pixels comprise two sub-pixels. A rectangular coordinate is established by taking the pixel as an origin, a length direction of the two-dimensional pixel array as an x-axis, and a width direction of the two-dimensional pixel array as a y-axis. The two sub-pixels lie in both a positive half axis and a negative half axis of the x-axis and lie in both a positive half axis and a negative half axis of the y-axis. The lens array comprises a plurality of lenses, each covering one of the pixels. The control method includes exposing the sub-pixels to output sub-pixel information; calculating a phase difference according to the sub-pixel information to perform a focus process; and in an in-focus condition, exposing the plurality of pixels in the two-dimensional pixel array to obtain a target image.

According to an embodiment of the present disclosure, a mobile terminal includes a shell and an image sensor installed in the shell. The image sensor comprises a two-dimensional pixel array and a lens array. The two-dimensional pixel array comprises a plurality of pixels. Part of the pixels comprise two sub-pixels. A rectangular coordinate is established by taking the pixel as an origin, a length direction of the two-dimensional pixel array as an x-axis, and a width direction of the two-dimensional pixel array as a y-axis. The two sub-pixels lie in both a positive half axis and a negative half axis of the x-axis and lie in both a positive half axis and a negative half axis of the y-axis. The lens array comprises a plurality of lenses, each covering one of the pixels.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

FIGS. 11-21 show a pixel distribution of the smallest repeating units and the lens covering methods according to embodiments of the present disclosure.

FIG. 22 is a flow chart of a control method according to an embodiment of the present disclosure.

DETAILED DESCRIPTION

Figure 1:
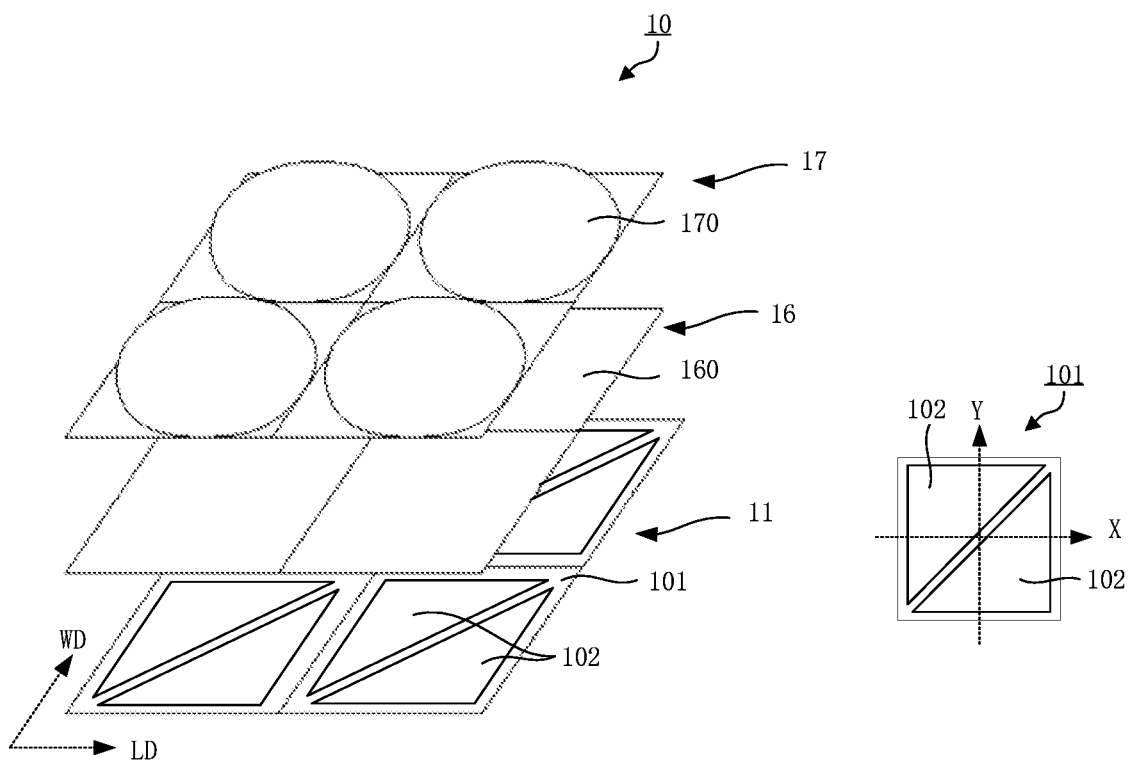
FIG. 1 is a diagram of an image sensor according to an embodiment of the present disclosure.

Embodiments of the present application are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present application, and are not to be construed as limiting the scope of the present application.

Please refer to FIG. 1. An image sensor 10 is disclosed. The image sensor 10 comprises a two-dimensional pixel array 11 and a lens array 17. The two-dimensional pixel array comprises a plurality of pixels 101. At least a part of the pixels 101 comprise two sub-pixels 102. A rectangular coordinate is established by taking each pixel 101 as an origin, a length direction LD of the two-dimensional pixel array as an X-axis, and a width direction WD of the two-dimensional pixel array as a Y-axis. The two sub-pixels 102 lie in both a positive half axis and a negative half axis of the X-axis and lie in both a positive half axis and a negative half axis of the Y-axis. The lens array 17 comprises a plurality of lenses 170, each covering one pixel 101.

Please refer to FIG. 1. A control method used in the image sensor 10 is disclosed. The image sensor 10 comprises a two-dimensional pixel array 11 and a lens array 17. The two-dimensional pixel array comprises a plurality of pixels 101. At least a part of the pixels 101 comprise two sub-pixels 102. A rectangular coordinate is established by taking each pixel 101 as an origin, a length direction LD of the two-dimensional pixel array as an X-axis, and a width direction WD of the two-dimensional pixel array as a Y-axis. The two sub-pixels 102 lie in both a positive half axis and a negative half axis of the X-axis and lie in both a positive half axis and a negative half axis of the Y-axis. The lens array 17, comprising a plurality of lenses 170, each covering one pixel 101. The control method comprises: the sub-pixel 102 is exposed to output sub-pixel information; calculating a phase different to perform a focus process; and the plurality of pixels in the two-dimensional pixel array are exposed to obtain a target image in an in-focus condition.

Figure 23:
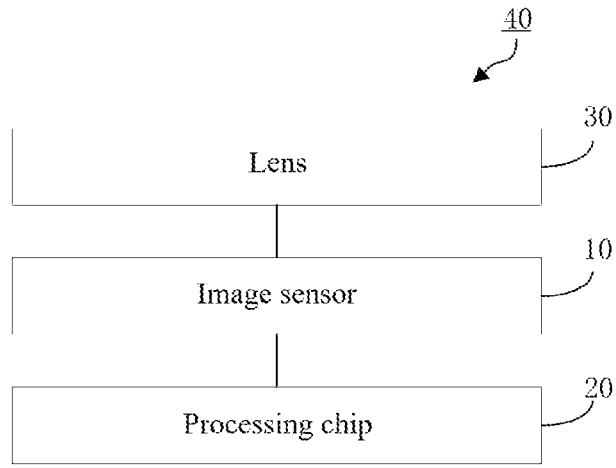
FIG. 23 is a diagram of a camera component according to an embodiment of the present disclosure.
Figure 24:
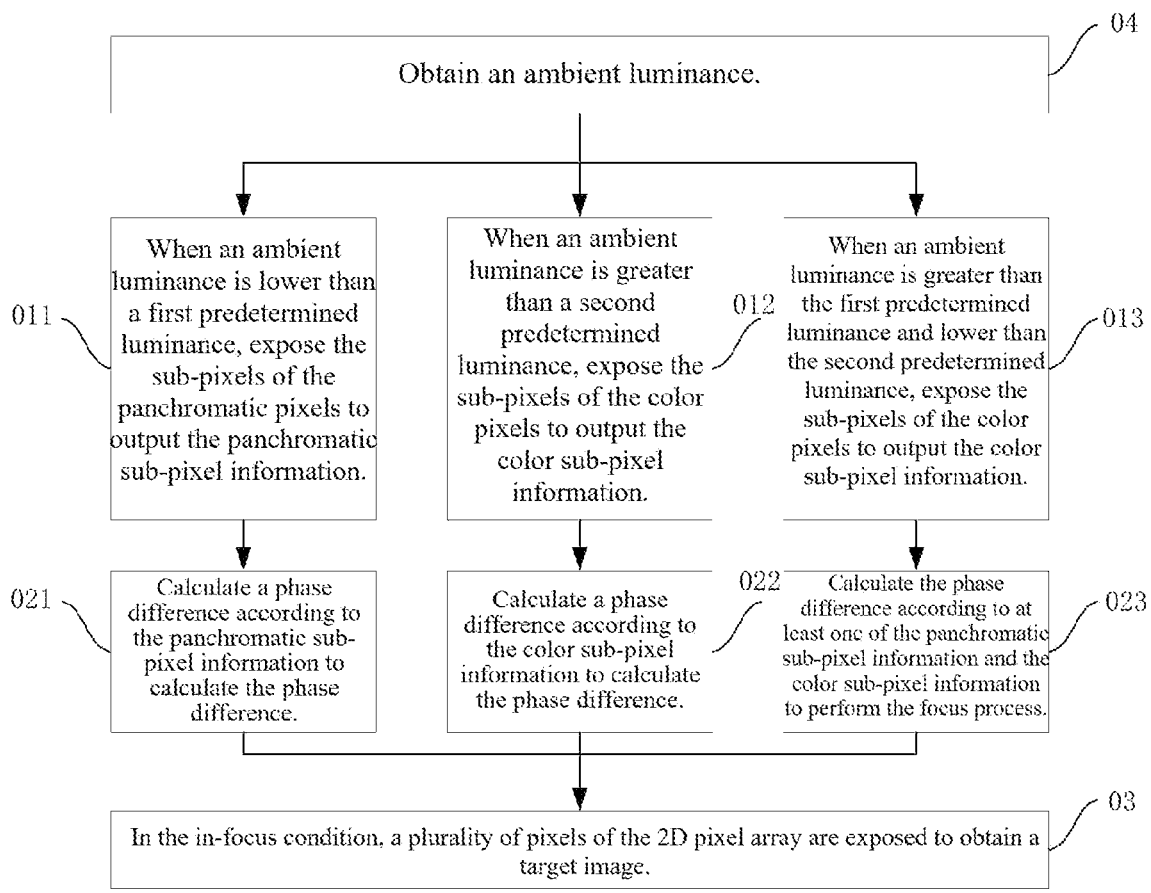
FIGS. 24-25 are flow charts of a control method according to an embodiment of the present disclosure.

Please refer to FIG. 1 and FIG. 23. A camera component 40 is disclosed. The camera component 40 comprises an image sensor 10 and a lens 30. The image sensor 10 could receive light passing through the lens. The image sensor 10 comprises a two-dimensional pixel array 11 and a lens array 17. The two-dimensional pixel array comprises a plurality of pixels 101. At least a part of the pixels 101 comprise two sub-pixels 102. A rectangular coordinate is established by taking each pixel 101 as an origin, a length direction LD of the two-dimensional pixel array as an X-axis, and a width direction WD of the two-dimensional pixel array as a Y-axis. The two sub-pixels 102 lie in both a positive half axis and a negative half axis of the X-axis and lie in both a positive half axis and a negative half axis of the Y-axis. The lens array 17, comprising a plurality of lenses 170, each covering one pixel 101.

Figure 42:
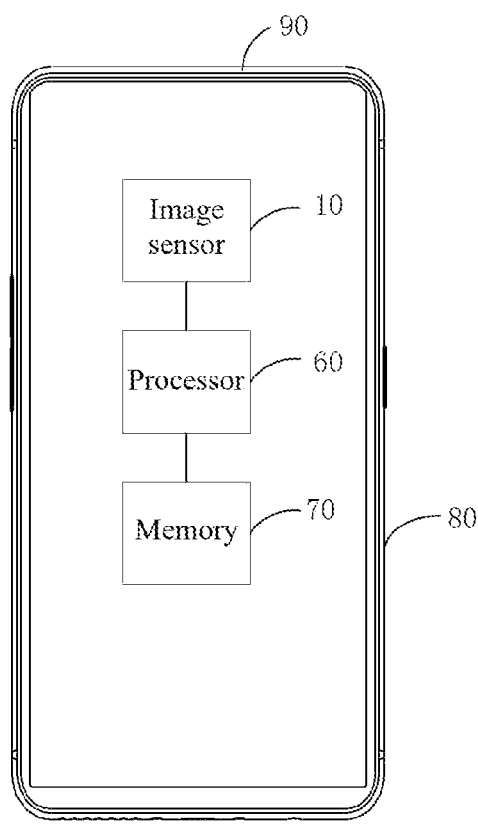
FIG. 42 is a diagram of a mobile terminal according to an embodiment of the present disclosure.

Please refer to FIG. 1 and FIG. 42. A mobile terminal 90 is disclosed. The mobile terminal 90 comprises a shell 80 an image sensor 10. The image sensor 10 is installed in the shell 80. The image sensor 10 could receive light passing through the lens. The image sensor 10 comprises a two-dimensional pixel array 11 and a lens array 17. The two-dimensional pixel array comprises a plurality of pixels 101. At least a part of the pixels 101 comprise two sub-pixels 102. A rectangular coordinate is established by taking each pixel 101 as an origin, a length direction LD of the two-dimensional pixel array as an X-axis, and a width direction WD of the two-dimensional pixel array as a Y-axis. The two sub-pixels 102 lie in both a positive half axis and a negative half axis of the X-axis and lie in both a positive half axis and a negative half axis of the Y-axis. The lens array 17, comprising a plurality of lenses 170, each covering one pixel 101.

Conventionally, a dual-core pixel could be used to perform the focus process. Each dual-core comprises two sub-pixels. The two sub-pixels constitute a phase detection pair. The phase difference could be calculated according to the signals outputted by the sub-pixels after the two sub-pixels are exposed. The two sub-pixels are often horizontally/vertically and symmetrically distributed. The horizontally-distributed phase detection pair could be used to obtain the horizontal phase information and it's difficult to obtain the vertical phase information. Therefore, if the horizontally-distributed phase detection pair is used to an event having single-color horizontal stripes, the phase detection pair will output similar signals and thus the phase difference calculated based on the similar signals will have a lower accuracy. In this way, the focus process will be performed with a lower accuracy as well. Similarly, the vertically-distributed phase detection pair could be used to obtain the vertical phase information and it's difficult to obtain the horizontal phase information. Therefore, if the vertically-distributed phase detection pair is used to an event having single-color vertical stripes, the phase detection pair will output similar signals and thus the phase difference calculated based on the similar signals will have a lower accuracy. In this way, the focus process will be performed with a lower accuracy as well.

Because of the above issues, an image sensor 10 (shown in FIG. 1) is disclosed. At least part of the pixels 101 in the image sensor 10 comprises two sub-pixels 102. The two sub-pixels 102 could receive not only the horizontal phase information but also vertical phase information. In this way, the image sensor 10 could be used in an event having a big numbers of single-color horizontal stripes or an event having a big numbers of single-color vertical stripes. This means that the image sensor 10 has a better adaptability and has a better accuracy of the focus process.

Please refer to FIG. 1. FIG. 1 is a diagram of an image sensor 10 and pixels 101 according to an embodiment of the present disclosure. The image sensor 10 comprises a two-dimensional pixel array 11, a filter array 16 and a lens array 17. In the light receiving direction of the image sensor 10, the lens array 17, the filter 16 and the two-dimensional pixel array 11 are orderly arranged.

The image sensor 10 could be implemented as a CMOS (Complementary Metal Oxide Semiconductor) sensor or a CCD (Charge-coupled Devices) sensor.

The two-dimensional pixel array 11 comprises a plurality of pixels 101 arranged in a two-dimensional array. At least part of the pixels 101 comprises two sub-pixels 102. A rectangular coordinate is established by taking each pixel 101 as an origin, a length direction LD of the two-dimensional pixel array 11 as an X-axis, and a width direction WD of the two-dimensional pixel array 11 as a Y-axis. The two sub-pixels 102 lie in both a positive half axis and a negative half axis of the X-axis and lie in both a positive half axis and a negative half axis of the Y-axis. As shown in FIG. 1, one sub-pixel 102 lies in the first, the second and the third domains of the rectangular coordinate, and another sub-pixel 102 lies in the first, the fourth and the third domains of the rectangular coordinate. In another embodiment, the length direction LD of the two-dimensional pixel array 11 could be the Y-axis and the width direction WD of the two-dimensional pixel array 11 could be the X-axis (not shown). In this case, one sub-pixel 102 lies in the second, the first, and the fourth domains of the rectangular coordinate, and another sub-pixel 102 lies in the second, the third and the fourth domains of the rectangular coordinate. The wording "at last part of the pixels 101 comprises two sub-pixels 102" could mean: (1) only a part of the pixels 101 comprises two sub-pixels 102 and the other pixels 101 only comprise one sub-pixel 102; (2) all of the pixels 101 comprises two sub-pixels 102.

The filter array 16 comprises a plurality of filters 160. Each filter 160 covers a corresponding pixel 101. The spectrum response of each pixel 101 (the color that the pixel 101 could receive) is determined by the color of the filter 160 corresponding to the pixel 102.

The lens array 17 comprises a plurality of lens 170. Each lens 170 covers a corresponding pixel 101.

Figure 2:
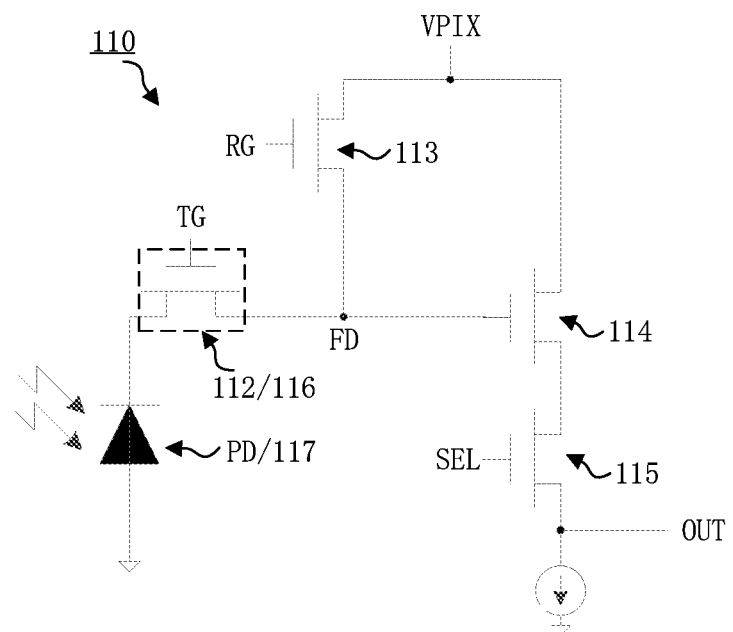
FIG. 2 is a diagram of a pixel circuit according to an embodiment of the present disclosure.

Please refer to FIG. 2. FIG. 2 is a diagram of a pixel circuit according to an embodiment of the present disclosure. When the pixel 101 comprises two sub-pixels 102, the pixel circuit of each sub-pixel 102 could be the pixel circuit 110 shown in FIG. 2. When the pixel 101 only comprises one sub-pixel 102, the pixel circuit of each sub-pixel 102 could also be the pixel circuit 110 shown in FIG. 2.

The pixel circuit 110 comprises a photoelectric conversion unit 117 (for example, a photodiode PD), an exposure control circuit 116 (for example, a transfer transistor 112), a reset circuit (for example, a reset transistor 113), an amplifying circuit (for example, an amplifying transistor 114), and a selection circuit (for example, a selection transistor 115). In this embodiment, the transfer transistor 112, the reset transistor 113, the amplifying transistor 114 and the selection transistor 115 could be all MOSFETs but this is not a limitation of the present disclosure.

Please refer to FIG. 1 and FIG. 2. The gate TG of the transfer transistor 112 is connected to the vertical driving unit (not shown) of the image sensor 10 through the exposure control line (not shown). The gate RG of the reset transistor 113 is connected to the vertical driving unit through a reset control line (not shown). The gate SEL of the selection transistor 115 is connected to the vertical driving unit through a selection line (not shown). The exposure control circuit 116 (such as the transfer transistor 112) of each pixel circuit 110 is electrically connected to the photoelectric conversion unit 117, which is used to convert the electric potentials accumulated due to the exposure of the photoelectric conversion unit 117.

For example, the photoelectric conversion unit 117 comprises a photodiode PD. The anode of the photodiode PD is, for example, connected to a ground. The photodiode PD transforms the received light into electric charges. The cathode of the photodiode PD is connected to a floating diffusion unit FD through the exposure control circuit 116 (such as the transfer transistor 112). The floating diffusion unit FD is connected to the gate of the amplifying transistor 114 and the source of the reset transistor 113.

The exposure control circuit 116 is the transfer transistor 112. The control end TG of the exposure control circuit 116 is the gate of the transfer transistor 112. When a pulse of an effective voltage level (such as a VPIX level) is transferred to the gate of the transfer transistor 112 through the exposure control line, the transfer transistor 112 is turned on. The transfer transistor 112 transfers the charges generated by the photodiode PD to the floating diffusion unit FD.

The drain of the reset transistor 113 is connected to the pixel power source VPIX. The source of the reset transistor 113 is connected to the floating diffusion unit FD. Before the charges are transferred from the photodiode PD to the floating diffusion unit FD, the pulse of the effective reset level is transferred to the gate of the reset transistor 113 through the reset line such that the reset transistor 113 is turned on. The reset transistor 113 resets the floating diffusion unit FD to the voltage level of the pixel power source VPIX.

The gate of the amplifying transistor 114 is connected to the floating diffusion unit FD. The drain of the amplifying transistor 114 is connected to the pixel power source VPIX.

After the reset transistor 113 resets the floating diffusion unit FD, the amplifying transistor 114 outputs a reset voltage level through the selection transistor 115 and the output end OUT. After the charges of the photodiode PD are transferred by the transfer transistor 112, the amplifying transistor 114 outputs the signal level through the selection transistor 115 and the output end OUT.

The drain of the selection transistor 115 is connected to the source of the amplifying transistor 114. The source of the selection transistor 115 is connected to the row processing unit (not shown) of the image sensor 10 through the output end OUT. When the pulse of the effective level is transferred to the gate of the selection transistor 115 through the selection line, the selection transistor 15 is turned on such that the signal outputted by the amplifying transistor 114 is transferred to the row processing unit through the selection transistor 115.

Please note, the pixel structure of the pixel circuit 110 is not limited to the structure shown in FIG. 2.

For example, the pixel circuit 110 could be a pixel structure having three transistors, in which the amplifying transistor 114 and the selection transistor 115 are achieved by a transistor.

For example, the exposure control circuit 116 is not limited to the single transfer transistor 112. All the other electronic devices or structure that have a control end to control its conductive state could be implemented as the exposure control circuit of this embodiment. In this embodiment, the single transfer transistor 112 is adopted because it's simpler, has a low cost, and is easy to control.

Figure 3:
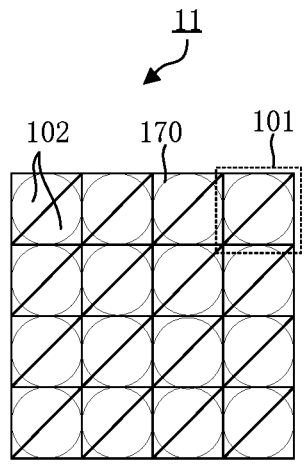
FIGS. 3-10 depict distributions of sub-pixels according to embodiments of the present disclosure.
Figure 3:
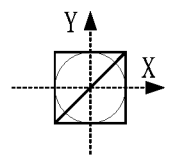

FIG. 3 shows a distribution of sub-pixels 102 in an image sensor 10 according to an embodiment of the present disclosure. Each pixel 101 comprises two sub-pixels 102. The sub-pixels 102 are distributed in the positive half and negative half of the X-axis and the positive half and negative half of the Y-axis. One of the sub-pixels 102 of each pixel 101 lies in the first, the second, and the third domains and the other of the sub-pixels 102 of each pixel 101 lies in the first, the fourth and the third domains. The cross-section of each sub-pixel 102 is in a shape of a triangle. Here, the above-mentioned "cross-section" means the cross-section extracted along the light receiving direction of the image sensor 10. The two sub-pixels of each pixel 101 are distributed symmetrically based on the center of the pixel 101.

Figure 4:
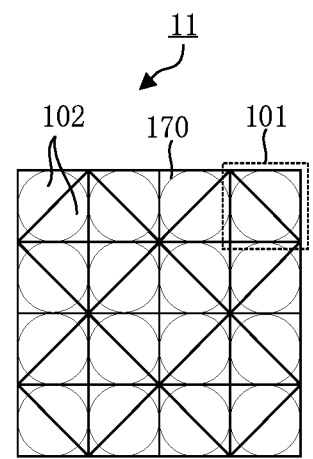
Figure 4:
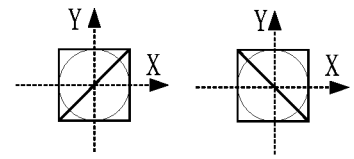

FIG. 4 shows a distribution of sub-pixels 102 in an image sensor 10 according to an embodiment of the present disclosure. Each pixel 101 comprises two sub-pixels 102. The sub-pixels 102 are distributed in the positive half and negative half of the X-axis and the positive half and negative half of the Y-axis. One of the sub-pixels 102 of a part of the pixels 101 lies in the first, the second, and the third domains and the other of the sub-pixels 102 of the part of the pixels 101 lies in the first, the fourth and the third domains. One of the sub-pixels 102 of another part of the pixels 101 lies in the second, the first, and the fourth domains and the other of the sub-pixels 102 of the another part of the pixels 101 lies in the second, the third and the fourth domains. The cross-section of each sub-pixel 102 is in a shape of a triangle. Here, the above-mentioned "cross-section" means the cross-section extracted along the light receiving direction of the image sensor 10. The two sub-pixels of each pixel 101 are distributed symmetrically based on the center of the pixel 101.

Figure 5:
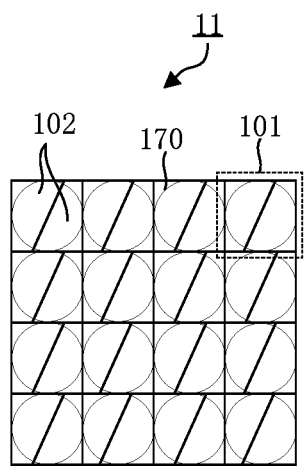
Figure 5:
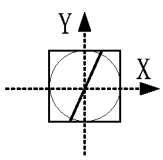

FIG. 5 shows a distribution of sub-pixels 102 in an image sensor 10 according to an embodiment of the present disclosure. Each pixel 101 comprises two sub-pixels 102. The sub-pixels 102 are distributed in the positive half and negative half of the X-axis and the positive half and negative half of the Y-axis. One of the sub-pixels 102 of each pixel 101 lies in the first, the second, and the third domains and the other of the sub-pixels 102 of each pixel 101 lies in the first, the fourth and the third domains. The cross-section of each sub-pixel 102 is in a shape of a trapezoid. In this case, the cross-section of one sub-pixel 102 is in a shape of a trapezoid having a narrower top and the cross-section of the other sub-pixel 102 is in a shape of a trapezoid having a narrower bottom. The above-mentioned "cross-section" means the cross-section extracted along the light receiving direction of the image sensor 10. The two sub-pixels of each pixel 101 are distributed symmetrically based on the center of the pixel 101.

Figure 6:
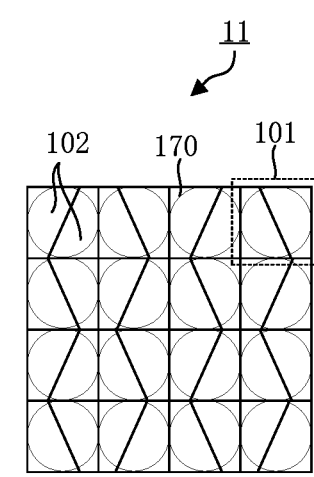
Figure 6:
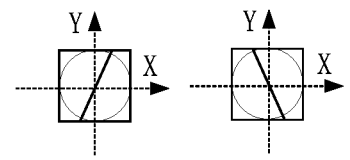

FIG. 6 shows a distribution of sub-pixels 102 in an image sensor 10 according to an embodiment of the present disclosure. Each pixel 101 comprises two sub-pixels 102. The sub-pixels 102 are distributed in the positive half and negative half of the X-axis and the positive half and negative half of the Y-axis. One of the sub-pixels 102 of a part of the pixels 101 lies in the first, the fourth, and the third domains and the other of the sub-pixels 102 of the part of the pixels 101 lies in the first, the second and the third domains. One of the sub-pixels 102 of another part of the pixels 101 lies in the second, the first, and the fourth domains and the other of the sub-pixels 102 of the another part of the pixels 101 lies in the second, the third and the fourth domains. The cross-section of each sub-pixel 102 is in a shape of a trapezoid. In this case, the cross-section of one sub-pixel 102 in a pixel 101 is in a shape of a trapezoid having a narrower top and the cross-section of the other sub-pixel 102 in the same pixel 101 is in a shape of a trapezoid having a narrower bottom. Here, the above-mentioned "cross-section" means the cross-section extracted along the light receiving direction of the image sensor 10. The two sub-pixels of each pixel 101 are distributed symmetrically based on the center of the pixel 101.

Figure 7:
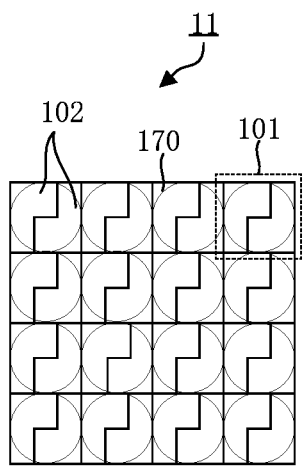

FIG. 7 shows a distribution of sub-pixels 102 in an image sensor 10 according to an embodiment of the present disclosure. Each pixel 101 comprises two sub-pixels 102. The sub-pixels 102 are distributed in the positive half and negative half of the X-axis and the positive half and negative half of the Y-axis. One of the sub-pixels 102 of each pixel 101 lies in the first, the second, and the third domains and the other of the sub-pixels 102 of each pixel 101 lies in the first, the fourth and the third domains. The cross-section of each sub-pixel 102 is in a shape of "L". In this case, the cross-section of one sub-pixel 102 in a pixel 101 is in a shape of a mirrored "L" and the cross-section of the other sub-pixel 102 in the same pixel 101 is in a shape of a reversed "L". Here, the above-mentioned "cross-section" means the cross-section extracted along the light receiving direction of the image sensor 10. The two sub-pixels of each pixel 101 are distributed symmetrically based on the center of the pixel 101.

Figure 8:
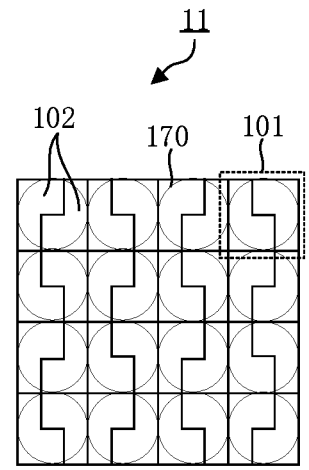

FIG. 8 shows a distribution of sub-pixels 102 in an image sensor 10 according to an embodiment of the present disclosure. Each pixel 101 comprises two sub-pixels 102. The sub-pixels 102 are distributed in the positive half and negative half of the X-axis and the positive half and negative half of the Y-axis. One of the sub-pixels 102 of a part of the pixels 101 lies in the first, the second, and the third domains and the other of the sub-pixels 102 of the part of the pixels 101 lies in the first, the fourth and the third domains. One of the sub-pixels 102 of another part of the pixels 101 lies in the second, the first, and the fourth domains and the other of the sub-pixels 102 of the another part of the pixels 101 lies in the second, the third and the fourth domains. The cross-section of each sub-pixel 102 is in a shape of "L". In this case, the cross-section of one sub-pixel 102 in a pixel 101 is in a shape of a mirrored "L" and the cross-section of the other sub-pixel 102 in the same pixel 101 is in a shape of a reversed "L". Here, the above-mentioned "cross-section" means the cross-section extracted along the light receiving direction of the image sensor 10. The two sub-pixels of each pixel 101 are distributed symmetrically based on the center of the pixel 101.

Figure 9:
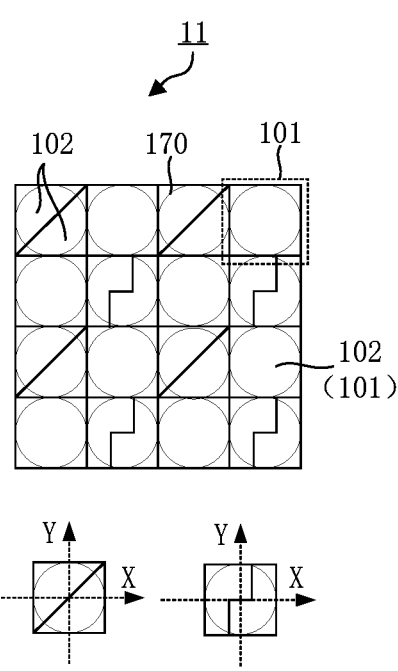

FIG. 9 shows a distribution of sub-pixels 102 in an image sensor 10 according to an embodiment of the present disclosure. A part of pixels 101 comprises two sub-pixels 102 and another part of the pixels 101 comprises only one sub-pixel 102. The pixels having two sub-pixels 102 and the pixels having one sub-pixel 102 are alternatively distributed in the rows and columns. The sub-pixels 102 are distributed in the positive half and negative half of the X-axis and the positive half and negative half of the Y-axis. One of the sub-pixels 102 of each pixel 101 lies in the first, the second, and the third domains and the other of the sub-pixels 102 of each pixel 101 lies in the first, the fourth and the third domains. The cross-section of some sub-pixels 102 is in a shape of "L". The cross-section of some other sub-pixels 102 is in a shape of triangle. Here, the above-mentioned "cross-section" means the cross-section extracted along the light receiving direction of the image sensor 10. The two sub-pixels 102 of in the pixels 101 having two sub-pixels 102 are distributed symmetrically based on the center of the pixels 101.

Figure 10:
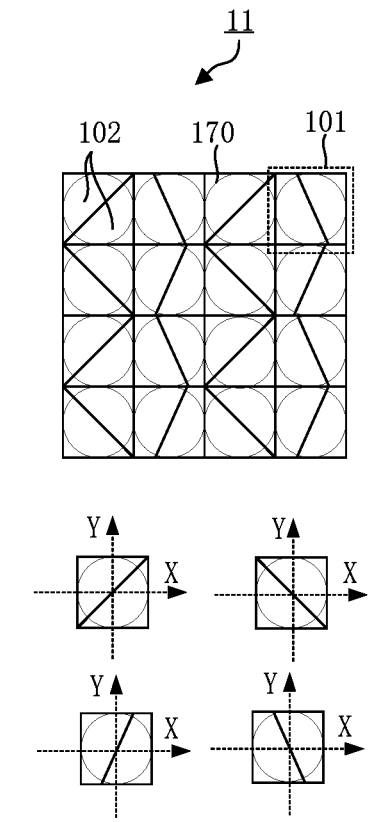

FIG. 10 shows a distribution of sub-pixels 102 in an image sensor 10 according to an embodiment of the present disclosure. Each pixel 101 comprises two sub-pixels 102. The sub-pixels 102 are distributed in the positive half and negative half of the X-axis and the positive half and negative half of the Y-axis. One of the sub-pixels 102 of a part of the pixels 101 lies in the first, the second, and the third domains and the other of the sub-pixels 102 of the part of the pixels 101 lies in the first, the fourth and the third domains. One of the sub-pixels 102 of another part of the pixels 101 lies in the second, the first, and the fourth domains and the other of the sub-pixels 102 of the another part of the pixels 101 lies in the second, the third and the fourth domains. The cross-section of some sub-pixels 102 is in a shape of triangle. The cross-section of some other sub-pixels 102 is in a shape of trapezoid. Here, the above-mentioned "cross-section" means the cross-section extracted along the light receiving direction of the image sensor 10. The two sub-pixels of each pixel 101 are distributed symmetrically based on the center of the pixel 101.

Please note, the shape of the cross-section of the sub-pixels 102 shown in FIGS. 3-10 is understood as various embodiments of the present disclosure. In the actual implementation, the shape of the cross-section of the sub-pixels 102 could be another regular or irregular shapes and this is not a limitation of the present disclosure.

In addition, FIG. 9 and FIG. 10 show that the sub-pixels 102 could have different shapes of cross-sections in a pixel array 11. These combinations of shapes are not limitations of the present disclosure.

For example, in the actual implementations, the sub-pixels 102 could have the "L" shape and the trapezoidal shape of cross-sections in a pixel array 11. Or, the sub-pixels 102 could have the "L" shape, the triangle shape and the trapezoidal shape of cross-sections in a pixel array 11. These changes all fall within the scope of the present disclosure.

Furthermore, FIG. 9 shows that the pixels 101 could have one or more sub-pixels 102 in a pixel array. This arrangement is not a limitation of the present disclosure. In the actual implementation, the pixels 101 in some rows could comprise only one sub-pixel 102 and the pixels in the other rows could comprise two sub-pixels 102 in a pixel array 11. Or, the pixels 101 in some columns could comprise only one sub-pixel 102 and the pixels in the other columns could comprise two sub-pixels 102 in a pixel array 11. These changes all fall within the scope of the present disclosure.

In the image sensor having multiple color pixels, different color pixels receive different amount of light during a pixel unit time. After some color is saturated, some color pixels may not reach the ideal state.

For example, if a color pixel is exposed to 60%-90% of its saturation exposure amount, the color pixel could have a better signal-to-noise ratio (SNR). However, this is just an example, not a limitation of the present disclosure.

Figure 11:
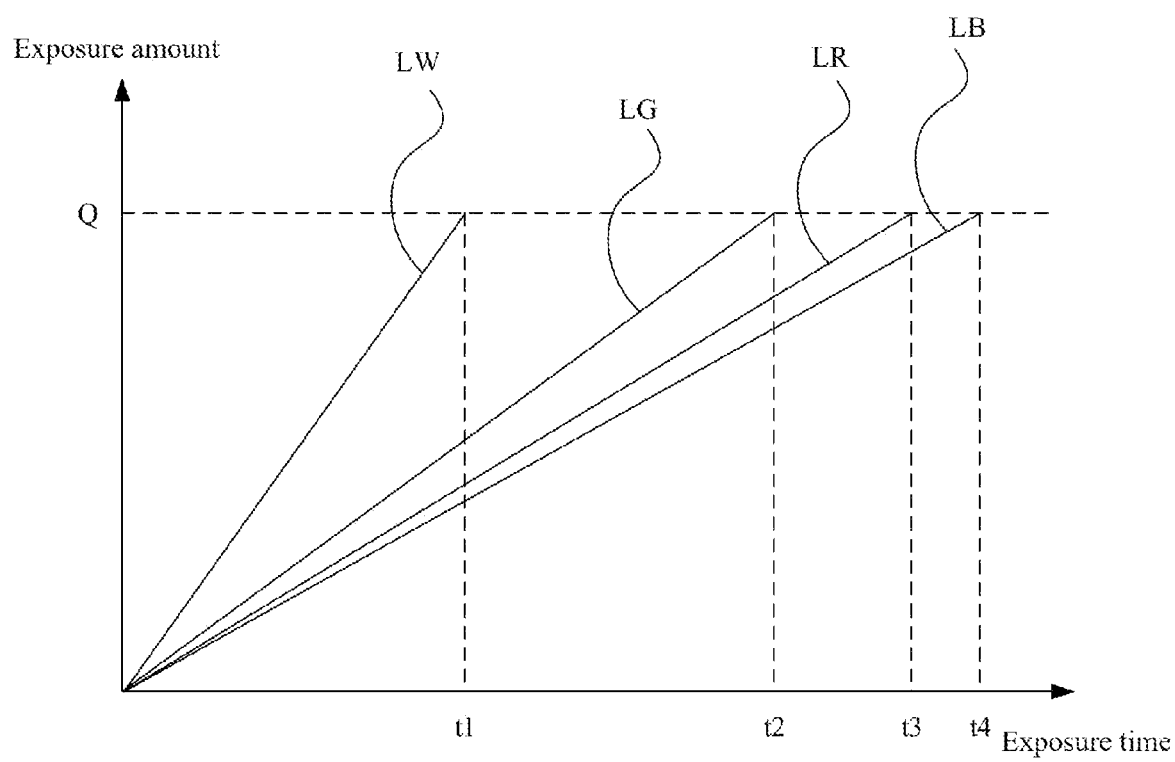
FIG. 11 is a diagram showing exposure saturation time of different color channels.

FIG. 11 takes the RGBW (red, green, blue, panchromatic) as an example. Please refer to FIG. 11. In FIG. 11, the X-axis represents the exposure time and the Y-axis represents the exposure amount. Q is the saturation exposure amount. LW is an exposure curve of the panchromatic pixel W. LG is an exposure curve of the green pixel G. LR an exposure curve of the red pixel R. LB an exposure curve of the blue pixel B.

From FIG. 11, it can be seen that the slope of the exposure curve LW of the panchromatic pixel W is the greatest. This means that the panchromatic pixel W could get the most exposure amount during a unit of time and the panchromatic pixel W reaches its saturation at the time t1. The slope of the exposure curve LG of the green pixel G is the second greatest. The green pixel G reaches its saturation at the time t2. The slope of the exposure curve LR of the red pixel R is the third greatest. The red pixel R reaches its saturation at the time t3. The slope of the exposure curve LB of the blue pixel B is the lowest. The blue pixel B reaches its saturation at the time t4. From FIG. 11, the received exposure amount of the panchromatic pixel W in a unit of time is greater than the received exposure amount of a color pixel. In other words, the sensitivity of the panchromatic pixel W is better than that of the color pixel.

If an image sensor having only color pixels is used to perform the phase detection auto focus, the RGB color pixels could receive more light when the ambient luminance is greater and thus could output pixel information with a better SNR. In this case, the phase detection auto focus could be more accurate. However, if the ambient luminance is lower, the RGB color pixels cannot receive enough light and thus the outputted pixel information has a lower SNR. In this case, the phase detection auto focus becomes less accurate.

Because of that, according to an embodiment, the two-dimensional pixel array 11 of image sensor 10 could comprise panchromatic pixels and the color pixels. In this embodiment, at least a part of the panchromatic pixels comprises two sub-pixels 102 and at least a part of the color pixels comprises two sub-pixels 102. In this way, the image sensor 10 could perform an accurate focus process in an event having a big amount of single-color horizontal/vertical stripes or an event having different ambient luminance. This could further raise the event adaptability.

The spectrum response of each pixel 101 (the color of light that the pixel 101 is able to receive) is determined by the color of the filter 160 corresponding to the pixel 101. In the present disclosure, the color pixels and the panchromatic pixels represent the pixels 101 that could respond to the filter 160 of specific colors.

FIGS. 11-21 show a pixel distribution of pixels 101 of an image sensor 10 (shown in FIG. 1) according to embodiments of the present disclosure. Please refer to FIGS. 12-21, the pixels 101 of the 2D pixel array 11 could comprise a plurality of panchromatic pixels W and a plurality of color pixels (such as a plurality of first color pixels A, a plurality of second color pixels B and a plurality of third color pixels C). Here, the color pixels and the panchromatic pixels could be distinguished by the band of the light that could pass through the covering filter 150 (shown in FIG. 1). The color pixel has a narrower spectrum response than that of the panchromatic pixel.

For example, the spectrum response of the color pixel could be a portion of the panchromatic pixel. In this embodiment, at least a part (including a portion or all) of the panchromatic pixels comprises two sub-pixels 102 and at least a part (including a portion or all) of the color pixels comprises two sub-pixels 102. The 2D pixel array is composed of a plurality of smallest repeating units (FIGS. 12-21 show various examples of smallest repeating unit in the image sensor 10). The smallest repeating unit is repeated and arranged in rows and columns. Each smallest repeating unit comprises a plurality of sub-units. Each sub-unit comprises a plurality of single-color pixels and a plurality of panchromatic pixels.

For example, each smallest repeating unit comprises four sub-units. Here, a sub-unit comprises a plurality of single-color pixels A (the first color pixels A) and a plurality of panchromatic pixels W. Two sub-units comprise a plurality of single-color pixels B (the second color pixels B) and a plurality of panchromatic pixels W. The last sub-unit comprises a plurality of single-color pixels C (the third color pixels C) and a plurality of panchromatic pixels W.

For example, the row number and the column number of the pixels in the smallest repeating unit could be the same.

For example, the smallest repeating unit comprises, but not limited to, a repeating unit of 4 rows and 4 columns, 6 rows and 6 columns, 8 rows and 8 columns, or 10 rows and 10 columns. Furthermore, the row number and the column number of the pixels in the sub-unit could be the same.

For example, the sub-unit comprises, but not limited to, a sub-unit of 2 rows and 2 columns, 3 rows and 3 columns, 4 rows and 4 columns, or 5 rows and 5 columns. This arrangement could help balance the resolution in the row and column directions and balance the color performance. In this way, the display effect could be raised.

In an embodiment, in a smallest repeating unit, the panchromatic pixels W are placed in the first diagonal direction D1 and the color pixels are placed in the second diagonal direction D2. The first diagonal direction D1 is different from the second diagonal direction D2.

Figure 12:
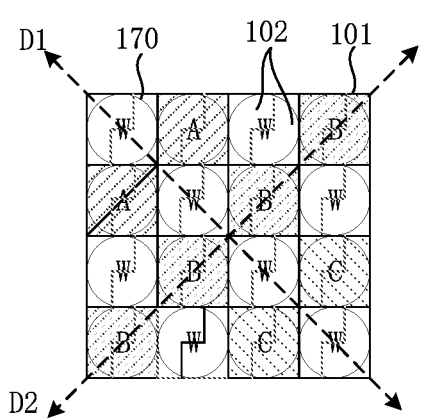

Please refer to FIG. 12. FIG. 12 is a diagram showing the distribution of the pixels 101 and the covering of the lens 170 in a smallest repeating unit according to an embodiment of the present disclosure. The repeating unit is composed of 16 pixels in a 4*4 array and the sub-unit is composed of 4 pixels in a 2*2 array. The distribution is:

| | | | |
|---|---|---|---|
| W | A | W | B |
| A | W | B | W |
| W | B | W | C |
| B | W | C | W. |

Here, W represents a panchromatic pixel. A represents the first color pixel of a plurality of color pixels. B represents the second color pixel of a plurality of color pixels. C represents the third color pixel of a plurality of color pixels.

As shown in FIG. 12, the panchromatic pixels W are arranged in the first diagonal direction D1 (the direction connecting the left top corner to the right bottom corner in FIG. 12). The color pixels are arranged in the second diagonal direction D2 (the direction connecting the right top corner to the left bottom corner in FIG. 12). The first diagonal direction D1 is different from the second diagonal direction D2. For example, the first diagonal direction is orthogonal to the second diagonal direction.

The first diagonal direction D1 and the second diagonal direction D2 are not limited to the diagonal itself. They include the direction parallel to the diagonals. Here, the term "direction" does not represent a single direction. It should be understood as a "distribution line". This means that the "direction" could represent two directions of a line.

As shown in FIG. 12, a lens 170 covers a pixel 101. Each panchromatic pixel and each color pixel include two sub-pixels 102. Each sub-pixel 102 lies in a positive half axis and a negative half axis of the X-axis and lie in both a positive half axis and a negative half axis of the Y-axis.

Figure 13:
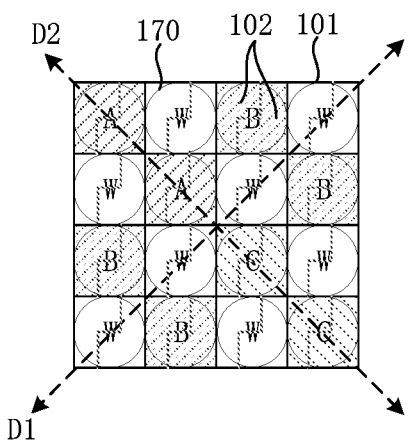

FIG. 13 is a diagram showing the distribution of the pixels 101 and the covering of the lens 170 in a smallest repeating unit according to another embodiment of the present disclosure.

The repeating unit is composed of 16 pixels 101 in a 4*4 array and the sub-unit is composed of 4 pixels 101 in a 2*2 array. The distribution is:

$$\begin{matrix} A & W & B & W \\ W & A & W & B \\ B & W & C & W \\ W & B & W & C \end{matrix}.$$

Here, W represents a panchromatic pixel. A represents the first color pixel of a plurality of color pixels. B represents the second color pixel of a plurality of color pixels. C represents the third color pixel of a plurality of color pixels.

As shown in FIG. 13, the panchromatic pixels W are arranged in the first diagonal direction D1 (the direction connecting the right top corner to the left bottom corner in FIG. 13). The color pixels are arranged in the second diagonal direction D2 (the direction connecting the left top corner to the right bottom corner in FIG. 13). The first diagonal direction D1 is different from the second diagonal direction D2. For example, the first diagonal direction is orthogonal to the second diagonal direction.

As shown in FIG. 13, a lens 170 covers a pixel 101. Each panchromatic pixel and each color pixel include two sub-pixels 102. Each sub-pixel 102 lies in a positive half axis and a negative half axis of the X-axis and lie in both a positive half axis and a negative half axis of the Y-axis.

Figure 14:
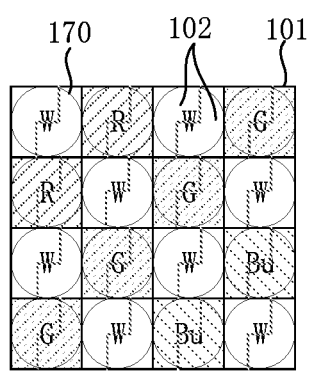
Figure 15:
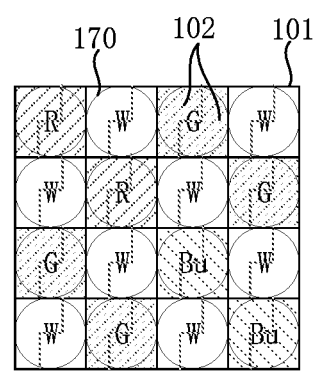

FIG. 14 is a diagram showing the distribution of the pixels 101 and the covering of the lens 170 in a smallest repeating unit according to another embodiment of the present disclosure. FIG. 15 is a diagram showing the distribution of the pixels 101 and the covering of the lens 170 in a smallest repeating unit according to another embodiment of the present disclosure.

The embodiments shown in FIG. 14 and FIG. 15 are respectively corresponding to the distributions and covering methods shown in FIG. 12 and FIG. 13. Here, the first color pixel A is a red color pixel R. The second color pixel B is a green pixel G. The third color pixel C is a blue pixel Bu.

In some embodiments, the response band of the panchromatic pixels W is the visible light band (for example, 400 nm-760 nm). For example, an infrared (IR) filter could be placed on top of the panchromatic pixels W to filter out IR.

In some embodiments, the response band of the panchromatic pixels W includes the visible light band and a near IR band (for example, 400 nm-1000 nm), which matches the response band of the photoelectric conversion device (such as a photodiode PD) in the image sensor 10.

For example, there could be no filter on top of the panchromatic pixels W and the response band of the panchromatic pixels W are determined by the response band of the photodiode (which means they are matching). Please note, the embodiments of the present disclosure are not limited to the above bands.

In another embodiment, in the smallest repeating unit shown in FIG. 12 and FIG. 13, the first color pixel A could be a red pixel R, the second color pixel B could be a yellow pixel Y and the third color pixel C could be a blue pixel Bu.

In another embodiment, in the smallest repeating unit shown in FIG. 12 and FIG. 13, the first color pixel A could be a magenta pixel M, the second color pixel B is a cyan-blue pixel Cy and the third color pixel C is a yellow pixel Y.

FIG. 16 is a diagram showing the distribution of the pixels 101 and the covering of the lens 170 in a smallest repeating unit according to another embodiment of the present disclosure. The repeating unit is composed of 36 pixels 101 in a 6*6 array and the sub-unit is composed of 9 pixels 101 in a 3*3 array. The distribution is:

$$\begin{matrix} W & A & W & B & W & B \\ A & W & A & W & B & W \\ W & A & W & B & W & B \\ B & W & B & W & C & W \\ W & B & W & C & W & C \\ B & W & B & W & C & W \end{matrix}.$$

Here, W represents a panchromatic pixel. A represents the first color pixel of a plurality of color pixels. B represents the second color pixel of a plurality of color pixels. C represents the third color pixel of a plurality of color pixels.

As shown in FIG. 16, the panchromatic pixels W are arranged in the first diagonal direction D1 (the direction connecting the left top corner to the right bottom corner in FIG. 16). The color pixels are arranged in the second diagonal direction D2 (the direction connecting the right top corner to the left bottom corner in FIG. 16). The first diagonal direction D1 is different from the second diagonal direction D2. For example, the first diagonal direction is orthogonal to the second diagonal direction.

As shown in FIG. 16, a lens 170 covers a pixel 101. Each panchromatic pixel and each color pixel include two sub-pixels 102. Each sub-pixel 102 lies in a positive half axis and a negative half axis of the X-axis and lie in both a positive half axis and a negative half axis of the Y-axis.

FIG. 17 is a diagram showing the distribution of the pixels 101 and the covering of the lens 170 in a smallest repeating unit according to another embodiment of the present disclosure. The repeating unit is composed of 36 pixels 101 in a 6*6 array and the sub-unit is composed of 9 pixels 101 in a 3*3 array. The distribution is:

$$\begin{array}{cccccc} A & W & A & W & B & W \\ W & A & W & B & W & B \\ A & W & A & W & B & W \\ W & B & W & C & W & C \\ B & W & B & W & C & W \\ W & B & W & C & W & C. \end{array}$$

Here, W represents a panchromatic pixel. A represents the first color pixel of a plurality of color pixels. B represents the second color pixel of a plurality of color pixels. C represents the third color pixel of a plurality of color pixels.

As shown in FIG. 17, the panchromatic pixels W are arranged in the first diagonal direction D1 (the direction connecting the right top corner to the left bottom corner in FIG. 17). The color pixels are arranged in the second diagonal direction D2 (the direction connecting the left top corner to the right bottom corner in FIG. 17). The first diagonal direction D1 is different from the second diagonal direction D2. For example, the first diagonal direction is orthogonal to the second diagonal direction.

As shown in FIG. 17, a lens 170 covers a pixel 101. Each panchromatic pixel and each color pixel include two sub-pixels 102. Each sub-pixel 102 lies in a positive half axis and a negative half axis of the X-axis and lie in both a positive half axis and a negative half axis of the Y-axis.

In the embodiments shown in FIG. 16 and FIG. 17, in a smallest repeating unit, the first color pixel A is a red color pixel R, the second color pixel B is a green pixel G and the third color pixel C is a blue pixel Bu. But this is not a limitation. The first color pixel A can be a red color pixel R, the second color pixel B can be a yellow pixel Y and the third color pixel C can be a blue pixel Bu. Or, the first color pixel A could be a magenta pixel M, the second color pixel B is a cyan-blue pixel Cy and the third color pixel C is a yellow pixel Y.

FIG. 18 is a diagram showing the distribution of the pixels 101 and the covering of the lens 170 in a smallest repeating unit according to another embodiment of the present disclosure. The repeating unit is composed of 64 pixels 101 in an 8*8 array and the sub-unit is composed of 16 pixels 101 in a 4*4 array. The distribution is:

$$\begin{array}{cccccccc} W & A & W & A & W & B & W & B \\ A & W & A & W & B & W & B & W \\ W & A & W & A & W & B & W & B \\ A & W & A & W & B & W & B & W \\ W & B & W & B & W & C & W & C \\ B & W & B & W & C & W & C & W \\ W & B & W & B & W & C & W & C \\ B & W & B & W & C & W & C & W. \end{array}$$

Here, W represents a panchromatic pixel. A represents the first color pixel of a plurality of color pixels. B represents the second color pixel of a plurality of color pixels. C represents the third color pixel of a plurality of color pixels.

As shown in FIG. 18, the panchromatic pixels W are arranged in the first diagonal direction D1 (the direction connecting the left top corner to the right bottom corner in FIG. 18). The color pixels are arranged in the second diagonal direction D2 (the direction connecting the right top corner to the left bottom corner in FIG. 18). The first diagonal direction D1 is different from the second diagonal direction D2. For example, the first diagonal direction is orthogonal to the second diagonal direction.

As shown in FIG. 18, a lens 170 covers a pixel 101. Each panchromatic pixel and each color pixel include two sub-pixels 102. Each sub-pixel 102 lies in a positive half axis and a negative half axis of the X-axis and lie in both a positive half axis and a negative half axis of the Y-axis.

FIG. 19 is a diagram showing the distribution of the pixels 101 and the covering of the lens 170 in a smallest repeating unit according to another embodiment of the present disclosure. The repeating unit is composed of 64 pixels 101 in an 8*8 array and the sub-unit is composed of 16 pixels 101 in a 4*4 array. The distribution is:

$$\begin{array}{cccccccc} A & W & A & W & B & W & B & W \\ W & A & W & A & W & B & W & B \\ A & W & A & W & B & W & B & W \\ W & A & W & A & W & B & W & B \\ B & W & B & W & C & W & C & W \\ W & B & W & B & W & C & W & C \\ B & W & B & W & C & W & C & W \\ W & B & W & B & W & C & W & C. \end{array}$$

Here, W represents a panchromatic pixel. A represents the first color pixel of a plurality of color pixels. B represents the second color pixel of a plurality of color pixels. C represents the third color pixel of a plurality of color pixels.

As shown in FIG. 19, the panchromatic pixels W are arranged in the first diagonal direction D1 (the direction connecting the right top corner to the left bottom corner in FIG. 18). The color pixels are arranged in the second diagonal direction D2 (the direction connecting the left top corner to the right bottom corner in FIG. 19). The first diagonal direction D1 is different from the second diagonal direction D2. For example, the first diagonal direction is orthogonal to the second diagonal direction.

As shown in FIG. 19, a lens 170 covers a pixel 101. Each panchromatic pixel and each color pixel include two sub-pixels 102. Each sub-pixel 102 lies in a positive half axis and a negative half axis of the X-axis and lie in both a positive half axis and a negative half axis of the Y-axis.

In the embodiments shown in FIGS. 12-19, the adjacent panchromatic pixels W are arranged in a diagonal and the adjacent color pixels are arranged in another diagonal in each of the sub-units. In another embodiment, the adjacent panchromatic pixels W are arranged in a horizontal line and the adjacent color pixels are arranged in another horizontal line in each of the sub-units. Or, the adjacent panchromatic pixels W are arranged in a vertical line and the adjacent color pixels are arranged in another vertical line in each of the sub-units. In the adjacent sub-units, the panchromatic pixels could be horizontally or vertically arranged, and the color pixels could be horizontally or vertically arranged.

FIG. 20 is a diagram showing the distribution of the pixels 101 and the covering of the lens 170 in a smallest repeating unit according to another embodiment of the present disclosure.

The repeating unit is composed of 16 pixels 101 in a 4*4 array and the sub-unit is composed of 4 pixels 101 in a 2*2 array. The distribution is:

$$\begin{array}{cccc} W & A & W & B \\ W & A & W & B \\ W & B & W & C \\ W & B & W & C. \end{array}$$

Here, W represents a panchromatic pixel. A represents the first color pixel of a plurality of color pixels. B represents the second color pixel of a plurality of color pixels. C represents the third color pixel of a plurality of color pixels.

As shown in FIG. 20, the panchromatic pixels W are arranged in the vertical direction and the color pixels are arranged in the vertical direction. A lens 170 covers a pixel 101. Each panchromatic pixel and each color pixel include two sub-pixels 102. Each sub-pixel 102 lies in a positive half axis and a negative half axis of the X-axis and lie in both a positive half axis and a negative half axis of the Y-axis.

FIG. 21 is a diagram showing the distribution of the pixels 101 and the covering of the lens 170 in a smallest repeating unit according to another embodiment of the present disclosure.

The repeating unit is composed of 16 pixels 101 in a 4*4 array and the sub-unit is composed of 4 pixels 101 in a 2*2 array. The distribution is:

$$\begin{array}{cccc} W & W & W & W \\ A & A & B & B \\ W & W & W & W \\ B & B & C & C. \end{array}$$

Here, W represents a panchromatic pixel. A represents the first color pixel of a plurality of color pixels. B represents the second color pixel of a plurality of color pixels. C represents the third color pixel of a plurality of color pixels.

As shown in FIG. 21, the panchromatic pixels W are arranged in the horizontal direction and the color pixels are arranged in the horizontal direction. A lens 170 covers a pixel 101. Each panchromatic pixel and each color pixel include two sub-pixels 102. Each sub-pixel 102 lies in a positive half axis and a negative half axis of the X-axis and lie in both a positive half axis and a negative half axis of the Y-axis.

In the repeating unit shown in FIG. 20 and FIG. 21, the first color pixel A could be a red pixel R, the second color pixel B can be a green pixel G and the third color pixel C can be a blue pixel Bu. But this is not a limitation. The first color pixel A can be a red color pixel R, the second color pixel B can be a yellow pixel Y and the third color pixel C can be a blue pixel Bu. Or, the first color pixel A could be a magenta pixel M, the second color pixel B is a cyan-blue pixel Cy and the third color pixel C is a yellow pixel Y.

In the smallest repeating unit shown in FIGS. 12-21, each panchromatic pixel and each color pixel comprises two sub-pixels 102. In another embodiment, all panchromatic pixels all comprise two sub-pixels 102 and a part of the color pixels comprises two sub-pixels. Or, a part of the panchromatic pixels comprises two sub-pixels 102 and all of color pixels comprise two sub-pixels 102.

In the smallest repeating unit shown in FIGS. 12-21, each sub-pixel 102 is in a shape of "L". In another embodiment, each sub-pixel 102 is in a shape of trapezoid. Or, each sub-pixel 102 is in a shape of a triangle. Or, a part of the sub-pixels 102 is in a shape of trapezoid and another part of the sub-pixels is in a shape of "L". Or, a part of the sub-pixels 102 is in a shape of trapezoid, another part of the sub-pixels 102 is in a shape of "L" and another part of the sub-pixels 102 is in a shape of triangle.

The panchromatic pixels and color pixels shown in FIGS. 12-21 in the 2D pixel array 11 (shown in FIG. 2) could be respectively controlled by different exposure control lines to achieve independent control of the exposure time of the panchromatic pixels and the color pixels. Here, for any one of the distributions of the 2D pixel array 11 shown in FIGS. 12-19, the control ends of at least two adjacent panchromatic pixels in the first diagonal direction are connected to the first exposure control line and the control ends of at least two adjacent color pixels in the second diagonal direction are connected to the second exposure control line. For any one of the distributions of the 2D pixel array 11 shown in FIGS. 20-21, the control ends of at least two adjacent panchromatic pixels in the same row/column are connected to the first exposure control line and the control ends of at least two adjacent color pixels in the same row/column are connected to the second exposure control line. The first exposure control line could transfer a first exposure signal to control the first exposure time of the panchromatic pixels. The second exposure control line could transfer a second exposure signal to control the second exposure time of the panchromatic pixels. In this embodiment, when the panchromatic pixel comprises two sub-pixels 102, the two sub-pixels 102 of the panchromatic pixel are electrically connected to the same first exposure control line. When the color pixel comprises two sub-pixels 102, the two sub-pixels 102 of the color pixel are electrically connected to the same second exposure control line.

When the exposure time of the panchromatic pixels and the exposure time of the color pixel are independently controlled, the first exposure time of the panchromatic pixels could be shorter than the second exposure time of the color pixel. For example, the ratio of the first exposure time to the second exposure time could be 1:2, 1:3, or 1:4.

In addition, when the ambient luminance is lower, it's more difficult for the color pixel to have enough exposure. In this case, the ratio of the first exposure time to the second exposure time could be adjusted as 1:2, 1:3, or 1:4 according to the ambient luminance. Here, when the exposure ratio is the above integer ratio or close to an integer ratio, it helps the setting and control of the setting signals of the timings.

In another embodiment, the corresponding relationship between the first exposure time and the second exposure time could be determined according to the ambient luminance.

For example, when the ambient luminance is lower than or equal to a luminance threshold, the panchromatic pixel is exposed for the first exposure time, which is set to be equal to the second exposure time. When the ambient luminance is greater than the luminance threshold, the panchromatic pixel is exposed for the first exposure time, which is set to be shorter than the second exposure time.

For example, the luminance difference is greater, the ratio of the first exposure time to the second exposure time is smaller.

For example, when the luminance is within a first range [a,b), the ratio of the first exposure time to the second exposure time is 1:2. When the luminance is within a second range [b,c), the ratio of the first exposure time to the second exposure time is 1:3. When the luminance is greater or equal to c, the ratio of the first exposure time to the second exposure time is 1:4.

In an embodiment, when the second color pixel B is a green pixel G, in the pixels 101 of the 2D pixel array, it could be arranged that only the green pixel G could have two sub-pixels 102 and the other pixels 101 have only one sub-pixel 102. It could be understood that the sensitivity of the green pixel G is higher than the sensitivities of the red pixel R and the blue pixel Bu but is lower than the white pixel W. Using the green pixels G to perform the phase detection auto focus to get the pixel information having a better SNR when the ambient luminance is comparatively low and to avoid the over-saturation when the ambient luminance is comparatively high. In this way, the event adaptability of the image sensor 10 could be raised.

Please refer to FIG. 1 and FIG. 22. According to an embodiment of the present disclosure, a control method is disclosed. The control method could be used in any of the above-mentioned image sensors 10. The control method comprises operations 01, 02, 03 as follows:

Operation 01: A plurality of sub-pixels 102 are exposed to output sub-pixel information.

Operation 02: Calculate a phase difference according to the sub-pixel information to perform a focus process.

Operation 03: in the in-focus condition, a plurality of pixels 101 of the 2D pixel array 11 are exposed to obtain a target image.

Please refer to FIG. 1 and FIG. 23. The control method of the present disclosure could be achieved by a camera component. The camera component 40 comprises a lens 30, an image sensor of any of the above embodiments, and a processing chip 20. The image sensor could receive the light passing through the lens 30 to generate an electric signal. The image sensor 10 is electrically connected to the processing chip 20. The processing chip 20 could be packaged with the image sensor 10 and the lens in the shell of the camera component. Or, the image sensor 10 and the lens 30 are packaged in the shell of the camera component and the processing chip 20 is placed outside the shell. The operation 01 could be performed by the image sensor 10. The operation 02 could be performed by the processing chip 20. The operation 03 could be achieved by the image sensor 10 and the processing chip 20. That is, the pixels 102 in the image sensor 10 are exposed to output the sub-pixel information. The processing chip 20 calculates the phase difference according to the sub-pixel information to perform the focus process. In the in-focus condition, the pixels 101 of the 2D pixel array 11 of the image sensor 10 are exposed and the processing chip 101 obtains the target image according to the exposure result of the pixels 101.

The control method and the camera component 40 adopts the image sensor 10 that could obtain phase information in the horizontal direction and vertical direction such that the control method and the camera component 40 could be applied in an event having single-color horizontal and vertical stripes. This raises the accuracy of the event adaptability and phase detection auto focus of the control method and the camera component 40.

Furthermore, the control method and the camera component 40 do not need to have a design to operation any pixels 101 of the image sensor 10. This means that all pixels 101 could be used to obtain an image and there is no need to perform any defective pixel compensation. This raises the quality of the target image obtained by the camera component 40.

In addition, all the pixels 102 having two sub-pixels 101 in the control method and the camera component 40 could be used for phase detection auto focus and the accuracy of the phase detection auto focus is better.

In another embodiment, such as the embodiments shown in FIGS. 12-21, the pixels 101 comprise a plurality of panchromatic pixels and a plurality of color pixels. The color pixels have a spectrum response narrower than that of the panchromatic pixels. At least a part of the panchromatic pixels and at least a part of the color pixels comprise two sub-pixels 102. The control method further comprises operation 4 as follows:

Operation 04: obtain an ambient luminance.

The operation 01 "a plurality of sub-pixels 102 are exposed to output sub-pixel information" comprises:

Operation 011: when an ambient luminance is lower than a first predetermined luminance, expose the sub-pixels 102 of the panchromatic pixels to output the panchromatic sub-pixel information.

The operation 02 "calculate a phase difference according to the sub-pixel information to perform a focus process" comprises:

Operation 021: calculate a phase difference according to the panchromatic sub-pixel information to calculate the phase difference.

The operation 01 "a plurality of sub-pixels 102 are exposed to output sub-pixel information" further comprises:

Operation 012: when an ambient luminance is greater than a second predetermined luminance, expose the sub-pixels 102 of the color pixels to output the color sub-pixel information.

The operation 02 "calculate a phase difference according to the sub-pixel information to perform a focus process" further comprises:

Operation 022: calculate a phase difference according to the color sub-pixel information to calculate the phase difference.

The operation 01 "a plurality of sub-pixels 102 are exposed to output sub-pixel information" further comprises:

Operation 013: when an ambient luminance is greater than the first predetermined luminance and lower than the second predetermined luminance, expose the sub-pixels 102 of the color pixels to output the color sub-pixel information.

The operation 02 "calculate a phase difference according to the sub-pixel information to perform a focus process" further comprises:

Operation 023: calculate the phase difference according to at least one of the panchromatic sub-pixel information and the color sub-pixel information to perform the focus process.

Please refer to FIG. 1 and FIG. 23, the operation 04, operation 021, operation 022 and operation 023 could be achieved by the processing chip 10. The operation 011, operation 012 and operation 013 could be achieved by the image sensor 10. In other words, the processing chip 20 could obtain the ambient luminance and expose the sub-pixels 102 of the panchromatic pixels in the image sensor to output the panchromatic sub-pixel information when the ambient luminance is lower than the first predetermined luminance. In this way, the processing chip 20 could calculate the phase difference according to the panchromatic sub-pixel information to perform the focus process. When the ambient luminance is greater than the second predetermined luminance, the sub-pixels of the color pixel in the image sensor 10 are exposed to output the color sub-pixel information. The processing chip 20 calculates the phase difference according to the color sub-pixel information to perform the focus process. When the ambient luminance is greater than the first predetermined luminance but lower than the second predetermined luminance, the sub-pixels 102 of the panchromatic pixels in the image sensor 10 are exposed to output the panchromatic sub-pixel information and the sub-pixels 102 of the color pixels in the image sensor 10 are exposed to output the color sub-pixel information. The processing chip 20 calculates the phase difference according to at least one of the panchromatic sub-pixel information and the color sub-pixel information to perform the focus process.

Here, the first predetermined luminance is lower than the second predetermined luminance. The operation of calculating the phase difference according to at least one of the panchromatic sub-pixel information and the color sub-pixel information: (1) calculating the phase difference according to only the panchromatic sub-pixel information to perform the focus process; (2) calculating the phase difference according to only the color sub-pixel information to perform the focus process; and/or (3) calculating the phase difference according to the panchromatic sub-pixel information and the color sub-pixel information to perform the focus process.

The control method and the camera component 40 adopt the image sensor 10 having the panchromatic pixels and the color pixels to achieve the phase detection auto focus. Accordingly, the panchromatic pixels, having a better sensitivity, could be used when the ambient luminance is comparatively low (for example, the ambient luminance is lower than or equal to the first predetermined luminance). The color pixels could be used when the ambient luminance is comparatively high (for example, the ambient luminance is greater than or equal to the second predetermined luminance). Furthermore, at least one type of panchromatic pixels and the color pixels are used when the ambient luminance is medium (for example, the ambient luminance is greater than the first predetermined luminance and lower than the second predetermined luminance). In this way, it could prevent from using the color pixels to perform the focus process because the color sub-pixel information outputted by the sub-pixels 102 of the color pixels has a lower SNR. Furthermore, it could also avoid using panchromatic pixels to perform the focus process because the panchromatic sub-pixel information outputted by the sub-pixels 102 of the panchromatic pixels may be over saturated. Thus, the phase detection auto focus could have a better accuracy in different events, which means that the event adaptability is also better.

Figure 25:
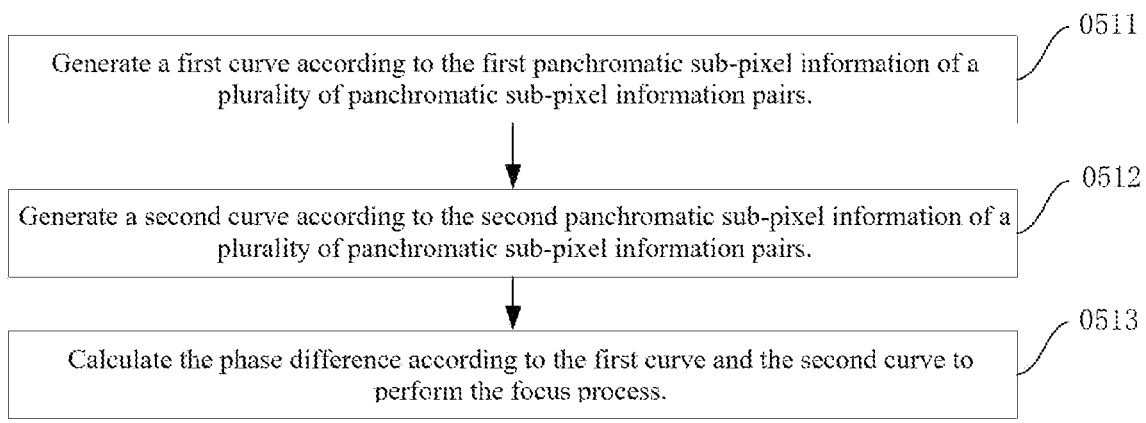

Please refer to FIG. 1, FIG. 12 and FIG. 25, the panchromatic pixels comprise two sub-pixels. The panchromatic sub-pixel information include a first panchromatic sub-pixel information and a second panchromatic sub-pixel information. The first panchromatic sub-pixel information and the second panchromatic sub-pixel information are respectively outputted by the panchromatic sub-pixel in the first location of the lens 170 and the panchromatic sub-pixel in the second location of the lens 170. When one first panchromatic sub-pixel information and one second panchromatic sub-pixel information are regarded as a panchromatic sub-pixel information pair. The operation of calculating the phase difference according to the panchromatic sub-pixel information to perform the focus process comprises operations 0511-0513 as follows:

Operation 0511: generate a first curve according to the first panchromatic sub-pixel information of a plurality of panchromatic sub-pixel information pairs.

Operation 0512: generate a second curve according to the second panchromatic sub-pixel information of a plurality of panchromatic sub-pixel information pairs.

Operation 0513: calculate the phase difference according to the first curve and the second curve to perform the focus process.

Please refer to FIG. 23. In an embodiment, the operation 0511, the operation 0512 and operation 0513 could be achieved by the processing chip 20. That is, the processing chip 20 could be used to form the first curve according to the first panchromatic sub-pixel information of a plurality of panchromatic sub-pixel information pairs, to form the second curve according to the second panchromatic sub-pixel information of a plurality of panchromatic sub-pixel information pairs, and to calculate the phase difference according to the first curve and the second curve to perform the focus process.

Figure 26:
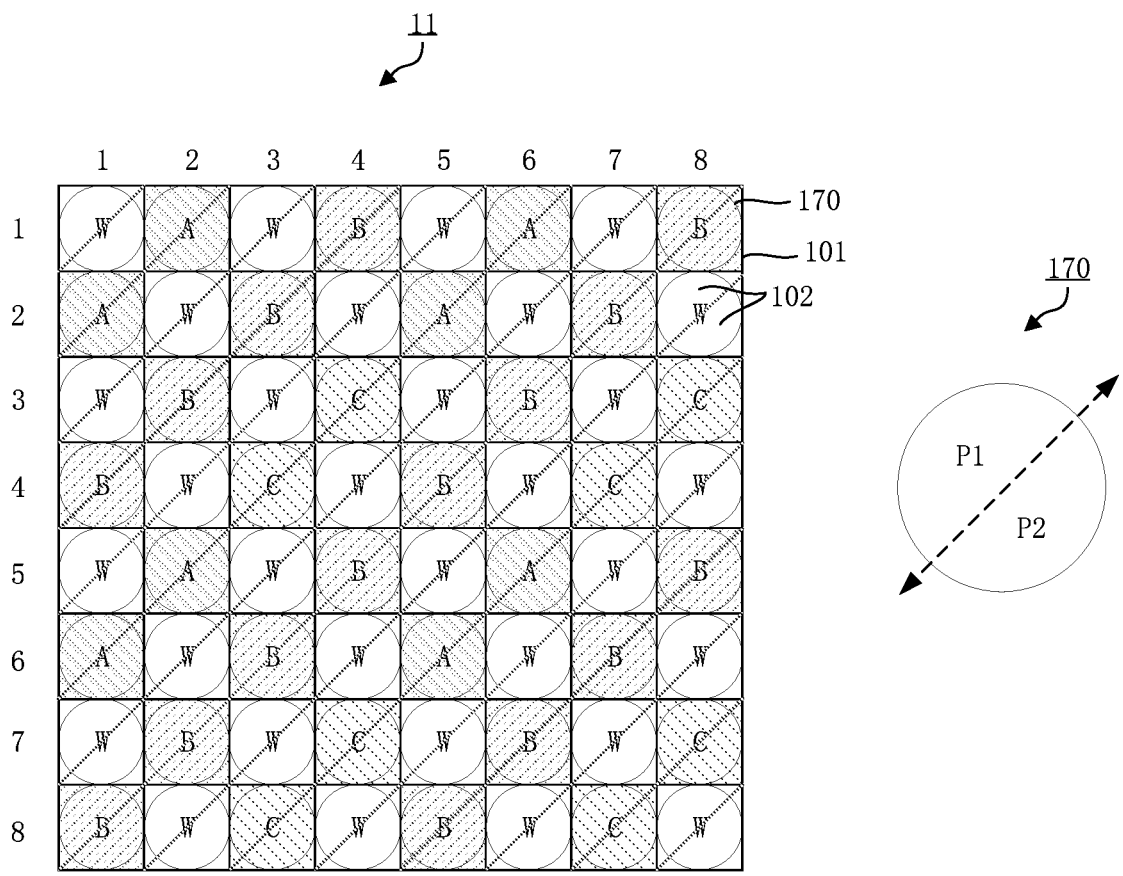
FIGS. 26-27 depict the theory of a control method according to an embodiment of the present disclosure.

Please refer to FIG. 26. The first position P1 of each lens 170 is a location of the left top corner of the lens 170. The second position P2 of each lens 170 is a location of the right bottom corner of the lens 170. Please note, the first position P1 and the second position P2 shown in FIG. 26 are determined by the distribution examples of the sub-pixels 102 shown in FIG. 26. For the other distributions of the sub-pixels 102, the first position P1 and the second position P2 could correspondingly change. For each panchromatic pixel W in the pixel array 11 shown in FIG. 26, one sub-pixel 102 (the panchromatic sub-pixel W) is in the first position P1 of the lens 170 and another sub-pixel 102 (the panchromatic sub-pixel W) is in the second position P2 of the lens 170. The first panchromatic sub-pixel information is outputted by the panchromatic sub-pixel W in the first position P1 of the lens 170 and the second sub-pixel information is outputted by the panchromatic sub-pixel W in the second position P2.

For example, the panchromatic sub-pixels $W_{11,P1}$, $W_{13,P1}$, $W_{15,P1}$, $W_{17,P1}$, $W_{22,P1}$, $W_{24,P1}$, $W_{26,P1}$, $W_{28,P1}$, etc. are in the first position P1 and the panchromatic sub-pixels $W_{11,P2}$, $W_{13,P2}$, $W_{15,P2}$, $W_{17,P2}$, $W_{22,P2}$, $W_{24,P2}$, $W_{26,P2}$, $W_{28,P2}$, etc. are in the second position P2. The two panchromatic sub-pixels W in the same panchromatic pixel form a panchromatic sub-pixel pair. Correspondingly, the two panchromatic sub-pixel information of the same panchromatic pixel W form a panchromatic sub-pixel information pair.

For example, the panchromatic sub-pixel information of the panchromatic sub-pixel $W_{11,P1}$ and the panchromatic sub-pixel information of the panchromatic sub-pixel $W_{11,P2}$ form a panchromatic sub-pixel information pair. The panchromatic sub-pixel information of the panchromatic sub-pixel $W_{13,P1}$ and the panchromatic sub-pixel information of the panchromatic sub-pixel $W_{13,P2}$ form a panchromatic sub-pixel information pair. The panchromatic sub-pixel information of the panchromatic sub-pixel $W_{15,P1}$ and the panchromatic sub-pixel information of the panchromatic sub-pixel $W_{15,P2}$ form a panchromatic sub-pixel information pair. The panchromatic sub-pixel information of the panchromatic sub-pixel $W_{17,P1}$ and the panchromatic sub-pixel information of the panchromatic sub-pixel $W_{17,P2}$ form a panchromatic sub-pixel information pair.

Figure 27:
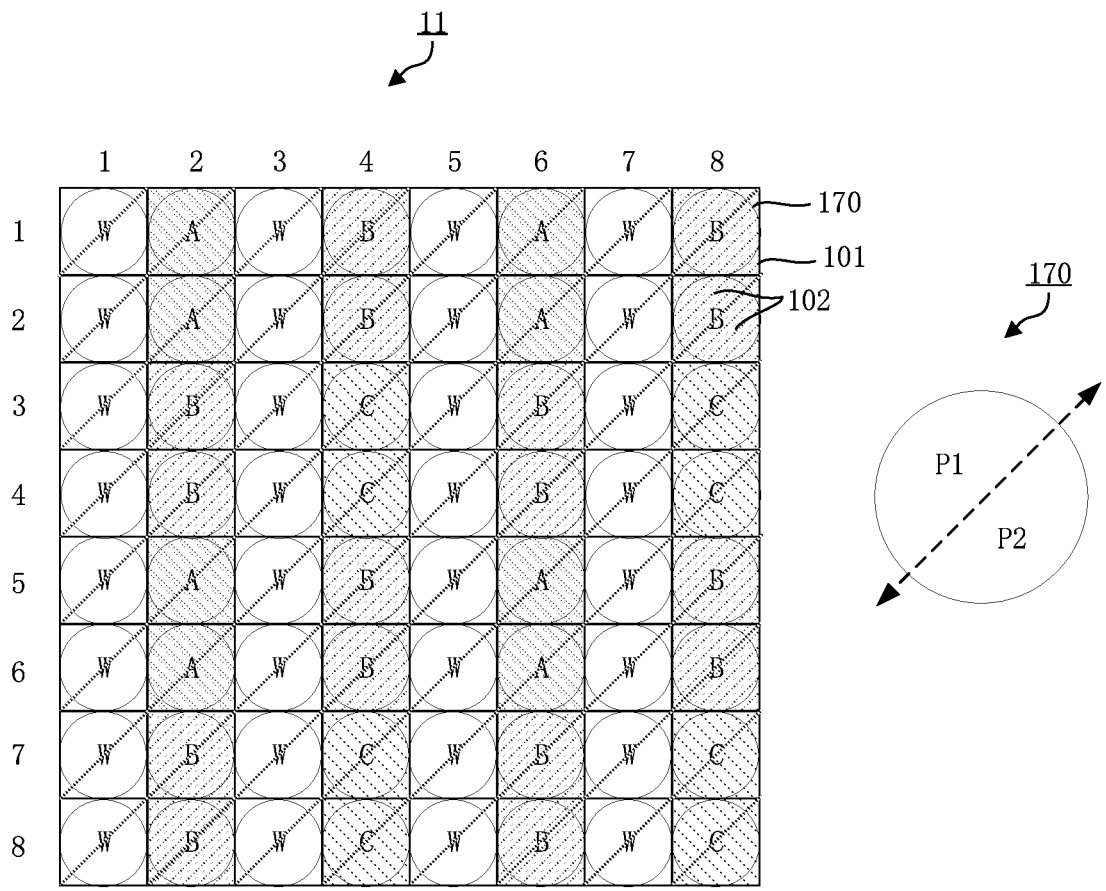

Please refer to FIG. 27. The first position P1 of each lens 170 is a location of the left top corner of the lens 170. The second position P2 of each lens 170 is a location of the right bottom corner of the lens 170. Please note, the first position P1 and the second position P2 shown in FIG. 27 are determined by the distribution examples of the sub-pixels 102 shown in FIG. 27. For the other distributions of the sub-pixels 102, the first position P1 and the second position P2 could correspondingly change. For each panchromatic pixel W in the pixel array 11 shown in FIG. 27, one sub-pixel 102 (the panchromatic sub-pixel W) is in the first position P1 of the lens 170 and another sub-pixel 102 (the panchromatic sub-pixel W) is in the second position P2 of the lens 170. The first panchromatic sub-pixel information is outputted by the panchromatic sub-pixel W in the first position P1 of the lens 170 and the second sub-pixel information is outputted by the panchromatic sub-pixel W in the second position P2.

For example, the panchromatic sub-pixels $W_{11,P1}$, $W_{13,P1}$, $W_{15,P1}$, $W_{17,P1}$, $W_{21,P1}$, $W_{23,P1}$, $W_{25,P1}$, $W_{27,P1}$, etc. are in the first position P1 and the panchromatic sub-pixels $W_{11,P2}$, $W_{13,P2}$, $W_{15,P2}$, $W_{17,P2}$, $W_{21,P2}$, $W_{23,P2}$, $W_{25,P2}$, $W_{27,P2}$, etc. are in the second position P2. The two panchromatic sub-pixels W in the same panchromatic pixel form a panchromatic sub-pixel pair. Correspondingly, the two panchromatic sub-pixel information of the same panchromatic pixel W form a panchromatic sub-pixel information pair.

F or example, the panchromatic sub-pixel information of the panchromatic sub-pixel $W_{11,P1}$ and the panchromatic sub-pixel information of the panchromatic sub-pixel $W_{11,P2}$ form a panchromatic sub-pixel information pair. The panchromatic sub-pixel information of the panchromatic sub-pixel $W_{13,P1}$ and the panchromatic sub-pixel information of the panchromatic sub-pixel $W_{13,P2}$ form a panchromatic sub-pixel information pair. The panchromatic sub-pixel information of the panchromatic sub-pixel $W_{15,P1}$ and the panchromatic sub-pixel information of the panchromatic sub-pixel $W_{15,P2}$ form a panchromatic sub-pixel information pair. The panchromatic sub-pixel information of the panchromatic sub-pixel $W_{17,P1}$ and the panchromatic sub-pixel information of the panchromatic sub-pixel $W_{17,P2}$ form a panchromatic sub-pixel information pair.

After obtaining a plurality of panchromatic sub-pixel information pairs, the processing chip 20 forms the first curve according to the first panchromatic sub-pixel information of the panchromatic sub-pixel information pairs and forms the second curve according to the second panchromatic sub-pixel information of the panchromatic sub-pixel information pairs. In this embodiment, multiple first panchromatic sub-pixel information could be used to depict a histogram curve (the first curve) and multiple second panchromatic sub-pixel information could be used to depict a histogram curve (the second curve). And then, the processing chip 20 could calculate the phase difference between the two histogram curves according to the peaks of the two histogram curves. And then, the processing chip 20 could determine the distance that the lens should move over according to the phase difference and the predetermined parameters. And then, the processing chip 20 could control the lens to move over the calculated distance such that the lens 30 could be in the in-focus condition.

Figure 28:
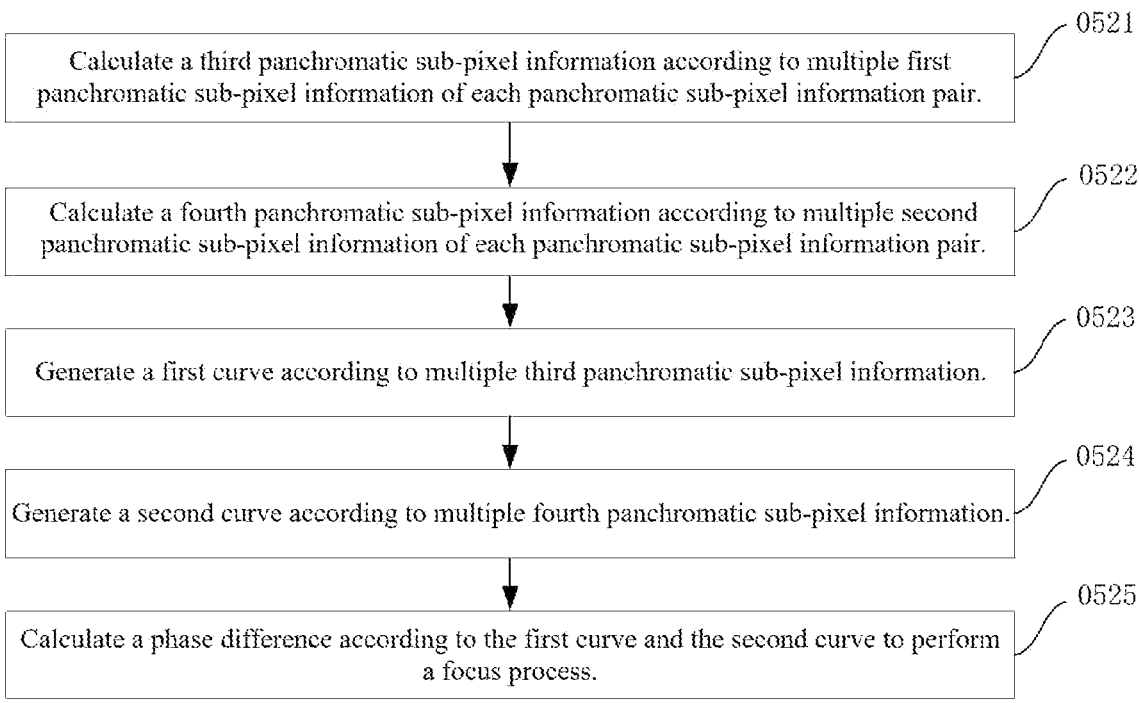
FIGS. 28-33 are flow charts a control method according to an embodiment of the present disclosure.

Please refer to FIG. 1, FIG. 12 and FIG. 28. The panchromatic pixel comprises two panchromatic sub-pixels. The panchromatic sub-pixel information comprises the first panchromatic sub-pixel information and the second panchromatic sub-pixel information. The first panchromatic sub-pixel information and the second panchromatic sub-pixel information are respectively outputted by the first panchromatic sub-pixel in the first position of the lens 170 and the second panchromatic sub-pixels in the second position of the lens 170. The first panchromatic sub-pixel information and the second panchromatic sub-pixel information form a panchromatic sub-pixel information pair. The operation of calculating the phase difference according to the panchromatic sub-pixel information to perform the focus process comprises operations 0521-0525 as follows:

Operation 0521: calculate a third panchromatic sub-pixel information according to multiple first panchromatic sub-pixel information of each panchromatic sub-pixel information pair.

Operation 0522: calculate a fourth panchromatic sub-pixel information according to multiple second panchromatic sub-pixel information of each panchromatic sub-pixel information pair.

Operation 0523: generate a first curve according to multiple third panchromatic sub-pixel information.

Operation 0524: generate a second curve according to multiple fourth panchromatic sub-pixel information.

Operation 0525: calculate a phase difference according to the first curve and the second curve to perform a focus process.

Please refer to FIG. 23 again. The operations 0521-0525 could be achieved by the processing chip 20. That is, the processing chip 20 could calculate the third panchromatic sub-pixel information according to multiple first panchromatic sub-pixel information of each panchromatic sub-pixel information pair and calculate a fourth panchromatic sub-pixel information according to multiple second panchromatic sub-pixel information of each panchromatic sub-pixel information pair. Furthermore, the processing chip 20 could form the first curve according to multiple third panchromatic sub-pixel information, form the second curve according to multiple fourth panchromatic sub-pixel information and calculate the phase difference according to the first and the second curves to perform a focus process.

Please refer to FIG. 26 again. The first position P1 of each lens 170 is a location of the left top corner of the lens 170. The second position P2 of each lens 170 is a location of the right bottom corner of the lens 170. Please note, the first position P1 and the second position P2 shown in FIG. 26 are determined by the distribution examples of the sub-pixels 102 shown in FIG. 26. For the other distributions of the sub-pixels 102, the first position P1 and the second position P2 could correspondingly change. For each panchromatic pixel W in the pixel array 11 shown in FIG. 26, one sub-pixel 102 (the panchromatic sub-pixel W) is in the first position P1 of the lens 170 and another sub-pixel 102 (the panchromatic sub-pixel W) is in the second position P2 of the lens 170. The first panchromatic sub-pixel information is outputted by the panchromatic sub-pixel W in the first position P1 of the lens 170 and the second sub-pixel information is outputted by the panchromatic sub-pixel W in the second position P2.

For example, the panchromatic sub-pixels $W_{11,P1}$, $W_{13,P1}$, $W_{15,P1}$, $W_{17,P1}$, $W_{22,P1}$, $W_{24,P1}$, $W_{26,P1}$, $W_{28,P1}$, etc. are in the first position P1 and the panchromatic sub-pixels $W_{11,P2}$, $W_{13,P2}$, $W_{15,P2}$, $W_{17,P2}$, $W_{22,P2}$, $W_{24,P2}$, $W_{26,P2}$, $W_{28,P2}$, etc. are in the second position P2. Multiple panchromatic sub-pixels W in the first position P1 and multiple panchromatic sub-pixels W in the second position P2 form a panchromatic sub-pixel pair. Correspondingly, multiple first panchromatic sub-pixel information and corresponding multiple second first panchromatic sub-pixel information form a panchromatic sub-pixel information pair.

For example, the multiple first panchromatic sub-pixel information and the multiple second panchromatic sub-pixel information of the sub-unit form a panchromatic sub-pixel information pair. That is, the panchromatic sub-pixel information of the panchromatic sub-pixels $W_{11,P1}$ and $W_{22,P1}$ and the panchromatic sub-pixel information of the panchromatic sub-pixels $W_{11,P2}$ and $W_{22,P2}$ form a panchromatic sub-pixel information pair. The panchromatic sub-pixel information of the panchromatic sub-pixels $W_{13,P1}$ and $W_{24,P1}$ and the panchromatic sub-pixel information of the panchromatic sub-pixels $W_{13,P2}$ and $W_{24,P2}$ form a panchromatic sub-pixel information pair. The panchromatic sub-pixel information of the panchromatic sub-pixels $W_{15,P1}$ and $W_{26,P1}$ and the panchromatic sub-pixel information of the panchromatic sub-pixels $W_{15,P2}$ and $W_{26,P2}$ form a panchromatic sub-pixel information pair. The panchromatic sub-pixel information of the panchromatic sub-pixels $W_{17,P1}$ and $W_{28,P1}$ and the panchromatic sub-pixel information of the panchromatic sub-pixels $W_{17,P2}$ and $W_{28,P2}$ form a panchromatic sub-pixel information pair. And so on. In another embodiment, multiple first panchromatic sub-pixel information and multiple second panchromatic sub-pixel information in the same smallest repeating unit could form a panchromatic sub-pixel information pair. That is, the panchromatic sub-pixel information of the panchromatic sub-pixels $W_{11,P1}$, $W_{13,P1}$, $W_{22,P1}$, $W_{24,P1}$, $W_{31,P1}$, $W_{33,P1}$, $W_{42,P1}$, and $W_{44,P1}$ and the panchromatic sub-pixel information of the panchromatic sub-pixels $W_{11,P2}$, $W_{13,P2}$, $W_{22,P2}$, $W_{24,P2}$, $W_{31,P2}$, $W_{33,P12}$, $W_{42,P2}$, and $W_{44,P2}$ form a panchromatic sub-pixel information pair.

Please refer to FIG. 27 again. The first position P1 of each lens 170 is a location of the left top corner of the lens 170. The second position P2 of each lens 170 is a location of the right bottom corner of the lens 170. Please note, the first position P1 and the second position P2 shown in FIG. 27 are determined by the distribution examples of the sub-pixels 102 shown in FIG. 27. For the other distributions of the sub-pixels 102, the first position P1 and the second position P2 could correspondingly change. For each panchromatic pixel W in the pixel array 11 shown in FIG. 27, one sub-pixel 102 (the panchromatic sub-pixel W) is in the first position P1 of the lens 170 and another sub-pixel 102 (the panchromatic sub-pixel W) is in the second position P2 of the lens 170. The first panchromatic sub-pixel information is outputted by the panchromatic sub-pixel W in the first position P1 of the lens 170 and the second sub-pixel information is outputted by the panchromatic sub-pixel W in the second position P2.

For example, the panchromatic sub-pixels $W_{11,P1}$, $W_{13,P1}$, $W_{15,P1}$, $W_{17,P1}$, $W_{21,P1}$, $W_{23,P1}$, $W_{25,P1}$, $W_{27,P1}$, etc. are in the first position P1 and the panchromatic sub-pixels $W_{11,P2}$, $W_{13,P2}$, $W_{15,P2}$, $W_{17,P2}$, $W_{21,P2}$, $W_{23,P2}$, $W_{25,P2}$, $W_{27,P2}$, etc. are in the second position P2. Multiple panchromatic sub-pixels W in the first position P1 and multiple panchromatic sub-pixels W in the second position P2 form a panchromatic sub-pixel pair. Correspondingly, multiple first panchromatic sub-pixel information and corresponding multiple second first panchromatic sub-pixel information form a panchromatic sub-pixel information pair.

For example, the multiple first panchromatic sub-pixel information and the multiple second panchromatic sub-pixel information of the sub-unit form a panchromatic sub-pixel information pair. That is, the panchromatic sub-pixel information of the panchromatic sub-pixels $W_{11,P1}$ and $W_{21,P1}$ and the panchromatic sub-pixel information of the panchromatic sub-pixels $W_{11,P2}$ and $W_{21,P2}$ form a panchromatic sub-pixel information pair. The panchromatic sub-pixel information of the panchromatic sub-pixels $W_{13,P1}$ and $W_{23,P1}$ and the panchromatic sub-pixel information of the panchromatic sub-pixels $W_{13,P2}$ and $W_{23,P2}$ form a panchromatic sub-pixel information pair. The panchromatic sub-pixel information of the panchromatic sub-pixels $W_{15,P1}$ and $W_{25,P1}$ and the panchromatic sub-pixel information of the panchromatic sub-pixels $W_{15,P2}$ and $W_{25,P2}$ form a panchromatic sub-pixel information pair. The panchromatic sub-pixel information of the panchromatic sub-pixels $W_{17,P1}$ and $W_{27,P1}$ and the panchromatic sub-pixel information of the panchromatic sub-pixels $W_{17,P2}$ and $W_{27,P2}$ form a panchromatic sub-pixel information pair. And so on. In another embodiment, multiple first panchromatic sub-pixel information and multiple second panchromatic sub-pixel information in the same smallest repeating unit could form a panchromatic sub-pixel information pair. That is, the panchromatic sub-pixel information of the panchromatic sub-pixels $W_{11,P1}$, $W_{13,P1}$, $W_{21,P1}$, $W_{23,P1}$, $W_{31,P1}$, $W_{33,P1}$, $W_{41,P1}$, and $W_{43,P1}$ and the panchromatic sub-pixel information of the panchromatic sub-pixels $W_{11,P2}$, $W_{13,P2}$, $W_{21,P2}$, $W_{23,P2}$, $W_{31,P2}$, $W_{33,P12}$, $W_{41,P2}$, and $W_{43,P2}$ form a panchromatic sub-pixel information pair.

After obtaining the multiple panchromatic sub-pixel information pairs, the processing chip 20 calculates the third panchromatic sub-pixel information according to multiple first panchromatic sub-pixel information of each panchromatic sub-pixel information pair and calculates a fourth panchromatic sub-pixel information according to multiple second panchromatic sub-pixel information of each panchromatic sub-pixel information pair.

For example, for the panchromatic sub-pixel information pair comprising the panchromatic sub-pixel information of the panchromatic sub-pixels $W_{11,P1}$ and $W_{22,P1}$ and the panchromatic sub-pixel information of the panchromatic sub-pixels $W_{11,P2}$ and $W_{22,P2}$, the calculation of the third panchromatic sub-pixel information could be $LT1=W_{11,P1}+W_{22,P1}$, and calculation of the fourth panchromatic sub-pixel information could be $RB1=W_{11,P2}+W_{22,P2}$. For the panchromatic sub-pixel information pair comprising the panchromatic sub-pixel information of the panchromatic sub-pixels $W_{11,P1}$, $W_{13,P1}$, $W_{22,P1}$, $W_{24,P1}$, $W_{31,P1}$, $W_{33,P1}$, $W_{42,P1}$, and $W_{44,P1}$ and the panchromatic sub-pixel information of the panchromatic sub-pixels $W_{11,P2}$, $W_{13,P2}$, $W_{22,P2}$, $W_{24,P2}$, $W_{31,P2}$, $W_{33,P12}$, $W_{42,P2}$, and $W_{44,P2}$, the calculation of the third panchromatic sub-pixel information could be $LT1=(W_{11,P1}+W_{13,P1}+W_{22,P1}+W_{24,P1}+W_{31,P1}+W_{33,P1}+W_{42,P1}+W_{44,P1})/8$, and calculation of the fourth panchromatic sub-pixel information could be $RB1=(W_{11,P2}+W_{13,P2}+W_{22,P2}+W_{24,P2}+W_{31,P2}+W_{33,P12}+W_{42,P2}+W_{44,P2})/8$. The calculations of the third panchromatic sub-pixel information and the fourth panchromatic sub-pixel information of the other panchromatic sub-pixel information pairs are similar and thus omitted here. In this way, the processing chip 20 could obtain multiple third panchromatic sub-pixel information and multiple fourth panchromatic sub-pixel information. The multiple third panchromatic sub-pixel information could be used to depict a histogram curve (the first curve) and the multiple fourth panchromatic sub-pixel information could be used to depict a histogram curve (the second curve). And then, the processing chip 20 calculates the phase difference according to the two histogram curves. And then, the processing chip could determine the distance that the lens 30 needs to be moved over according to the phase difference and predetermined parameters. At last, the processing chip 20 could control the lens 30 to move over the distance such that the lens could be in the in-focus condition.

Figure 29:
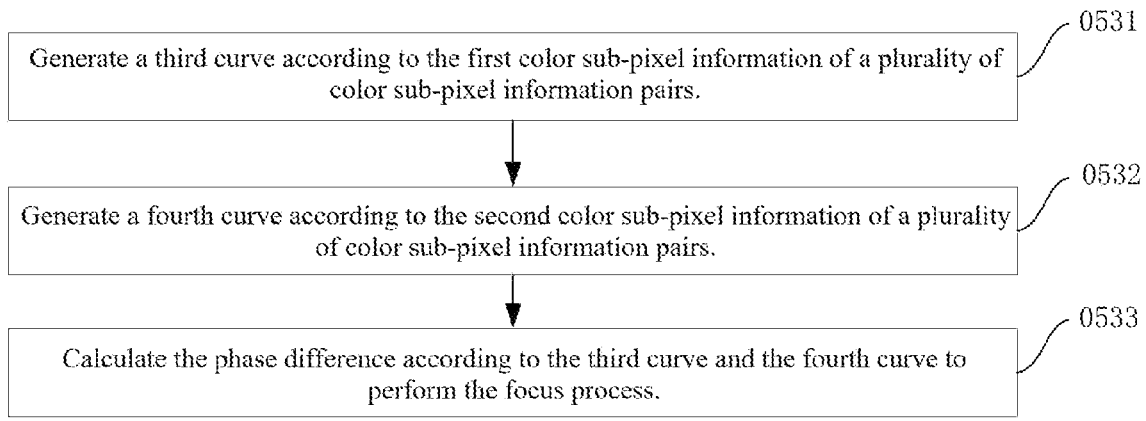

Please refer to FIG. 1, FIG. 12 and FIG. 29. The color pixel comprises two color sub-pixels. The panchromatic sub-pixel information comprises the first color sub-pixel information and the second color sub-pixel information. The first color sub-pixel information and the second color sub-pixel information are respectively outputted by the first color sub-pixel in the first position of the lens 170 and the second color sub-pixel in the second position of the lens 170. The first color sub-pixel information and the second color sub-pixel information form a color sub-pixel information pair. The operation of calculating the phase difference according to the color sub-pixel information to perform the focus process comprises operations 0531-0533 as follows:

Operation 0531: generate a third curve according to the first color sub-pixel information of a plurality of color sub-pixel information pairs.

Operation 0532: generate a fourth curve according to the second color sub-pixel information of a plurality of color sub-pixel information pairs.

Operation 0533: calculate the phase difference according to the third curve and the fourth curve to perform the focus process.

Please refer to FIG. 23. In an embodiment, the operation 0531, the operation 0532 and operation 0533 could be achieved by the processing chip 20. That is, the processing chip 20 could be used to form the third curve according to the first color sub-pixel information of a plurality of color sub-pixel information pairs, to form the fourth curve according to the second color sub-pixel information of a plurality of color sub-pixel information pairs, and to calculate the phase difference according to the third curve and the fourth curve to perform the focus process.

Please refer to FIG. 26. The first position P1 of each lens 170 is a location of the left top corner of the lens 170. The second position P2 of each lens 170 is a location of the right bottom corner of the lens 170. Please note, the first position P1 and the second position P2 shown in FIG. 26 are determined by the distribution examples of the sub-pixels 102 shown in FIG. 26. For the other distributions of the sub-pixels 102, the first position P1 and the second position P2 could correspondingly change. For each color pixel W in the pixel array 11 shown in FIG. 26, one sub-pixel 102 (the color sub-pixel A, the color sub-pixel B or the color sub-pixel C) is in the first position P1 of the lens 170 and another sub-pixel 102 (the color sub-pixel A, the color sub-pixel B or the color sub-pixel C) is in the second position P2 of the lens 170. The first color sub-pixel information is outputted by the color sub-pixel W in the first position P1 of the lens 170 and the second color sub-pixel information is outputted by the color sub-pixel W in the second position P2.

For example, the color sub-pixels $A_{12,P1}$, $B_{14,P1}$, $A_{16,P1}$, $B_{18,P1}$, $A_{21,P1}$, $B_{23,P1}$, $A_{25,P1}$, $B_{27,P1}$, etc. are in the first position P1 and the color sub-pixels $A_{12,P2}$, $B_{14,P2}$, $A_{16,P2}$, $B_{18,P2}$, $A_{21,P2}$, $B_{23,P2}$, $A_{25,P2}$, $B_{27,P2}$, etc. are in the second position P2. The two color sub-pixels in the same color pixel form a color sub-pixel pair. Correspondingly, the two color sub-pixel information of the color sub-pixels of the same color pixel form a color sub-pixel information pair.

For example, the color sub-pixel information of the color sub-pixel $A_{12,P1}$ and the color sub-pixel information of the color sub-pixel $A_{12,P2}$ form a color sub-pixel information pair. The color sub-pixel information of the color sub-pixel $B_{14,P1}$ and the color sub-pixel information of the color sub-pixel $B_{14,P2}$ form a color sub-pixel information pair. The color sub-pixel information of the color sub-pixel $A_{16,P1}$ and the color sub-pixel information of the color sub-pixel $A_{16,P2}$ form a color sub-pixel information pair. The color sub-pixel information of the color sub-pixel $B_{18,P1}$ and the color sub-pixel information of the color sub-pixel $B_{18,P1}$ form a color sub-pixel information pair.

Please refer to FIG. 27. The first position P1 of each lens 170 is a location of the left top corner of the lens 170. The second position P2 of each lens 170 is a location of the right bottom corner of the lens 170. Please note, the first position P1 and the second position P2 shown in FIG. 27 are determined by the distribution examples of the sub-pixels 102 shown in FIG. 27. For the other distributions of the sub-pixels 102, the first position P1 and the second position P2 could correspondingly change. For each color pixel in the pixel array 11 shown in FIG. 27, one sub-pixel 102 (the color sub-pixel A, the color sub-pixel B and the color sub-pixel C) is in the first position P1 of the lens 170 and another sub-pixel 102 (the color sub-pixel A, the color sub-pixel B and the color sub-pixel C) is in the second position P2 of the lens 170. The first color sub-pixel information is outputted by the color sub-pixel in the first position P1 of the lens 170 and the second color sub-pixel information is outputted by the color sub-pixel in the second position P2.

For example, the color sub-pixels $A_{12,P1}$, $B_{14,P1}$, $A_{16,P1}$, $B_{18,P1}$, $A_{22,P1}$, $B_{24,P1}$, $A_{26,P1}$, $B_{28,P1}$, etc. are in the first position P1 and the color sub-pixels $A_{12,P2}$, $B_{14,P2}$, $A_{16,P2}$, $B_{18,P2}$, $A_{22,P2}$, $B_{24,P2}$, $A_{26,P2}$, $B_{28,P2}$, etc. are in the second position P2. The two color sub-pixels in the same color pixel form a color sub-pixel pair. Correspondingly, the two color sub-pixel information of the two color sub-pixels of the same color pixel W form a color sub-pixel information pair.

For example, the color sub-pixel information of the color sub-pixel $A_{12,P1}$ and the color sub-pixel information of the color sub-pixel $A_{12,P2}$ form a color sub-pixel information pair. The color sub-pixel information of the color sub-pixel $B_{14,P1}$ and the color sub-pixel information of the color sub-pixel $B_{14,P2}$ form a color sub-pixel information pair. The color sub-pixel information of the color sub-pixel $A_{16,P1}$ and the color sub-pixel information of the color sub-pixel $A_{16,P2}$ form a color sub-pixel information pair. The color sub-pixel information of the color sub-pixel $B_{18,P1}$ and the color sub-pixel information of the color sub-pixel $B_{18,P2}$ form a color sub-pixel information pair.

After obtaining a plurality of color sub-pixel information pairs, the processing chip 20 forms the third curve according to the first color sub-pixel information of the color sub-pixel information pairs and forms the fourth curve according to the second color sub-pixel information of the color sub-pixel information pairs. In this embodiment, multiple first color sub-pixel information could be used to depict a histogram curve (the third curve) and multiple second color sub-pixel information could be used to depict a histogram curve (the fourth curve). And then, the processing chip 20 could calculate the phase difference between the two histogram curves according to the peaks of the two histogram curves. And then, the processing chip 20 could determine the distance that the lens should move over according to the phase difference and the predetermined parameters. And then, the processing chip 20 could control the lens to move over the calculated distance such that the lens 30 could be in the in-focus condition.

Figure 30:
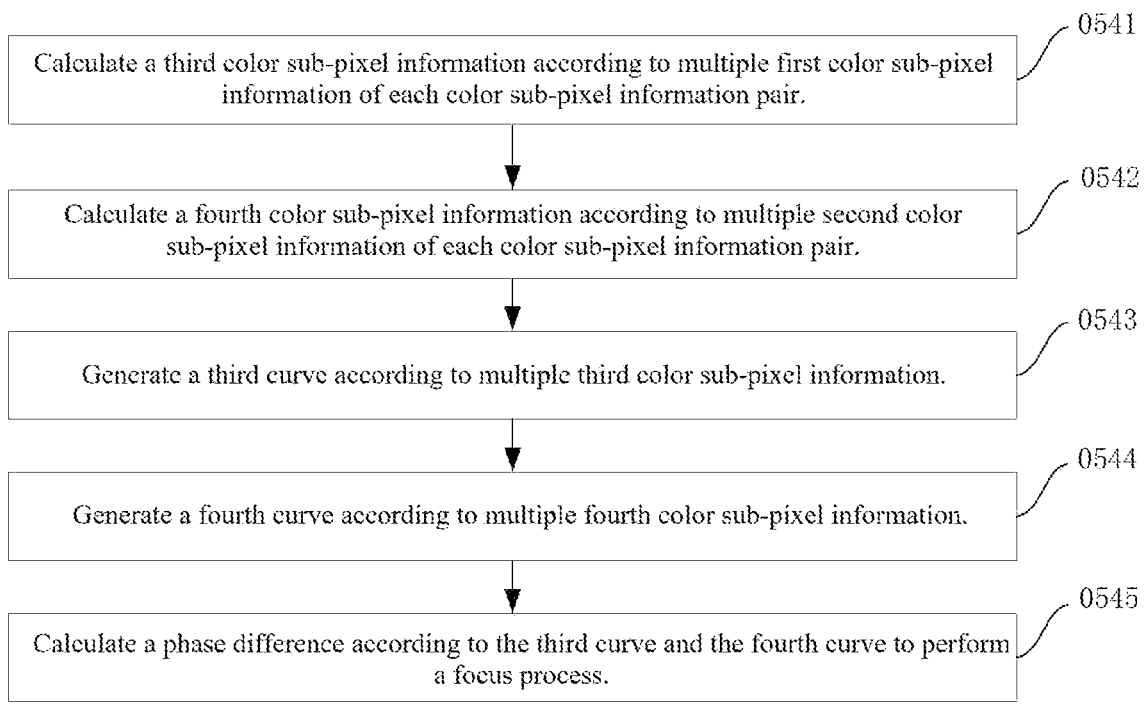

Please refer to FIG. 1, FIG. 12 and FIG. 30. The color pixel comprises two color sub-pixels. The color sub-pixel information comprises the first color sub-pixel information and the second color sub-pixel information. The first color sub-pixel information and the second color sub-pixel information are respectively outputted by the first color sub-pixel in the first position of the lens 170 and the second color sub-pixels in the second position of the lens 170. The first color sub-pixel information and the second color sub-pixel information form a color sub-pixel information pair. The operation of calculating the phase difference according to the color sub-pixel information to perform the focus process comprises operations 0541-0545 as follows:

Operation 0541: calculate a third color sub-pixel information according to multiple first color sub-pixel information of each color sub-pixel information pair.

Operation 0542: Calculate a fourth color sub-pixel information according to multiple second color sub-pixel information of each color sub-pixel information pair.

Operation 0543: Generate a third curve according to multiple third color sub-pixel information.

Operation 0544: Generate a fourth curve according to multiple fourth color sub-pixel information.

Operation 0545: Calculate a phase difference according to the third curve and the fourth curve to perform a focus process.

Please refer to FIG. 23 again. In an embodiment, the operations 0541-0545 could be achieved by the processing chip 20. That is, the processing chip 20 could calculate the third color sub-pixel information according to multiple first color sub-pixel information of each color sub-pixel information pair and calculate a fourth color sub-pixel information according to multiple second color sub-pixel information of each color sub-pixel information pair. Furthermore, the processing chip 20 could form the third curve according to multiple third color sub-pixel information, form the fourth curve according to multiple fourth color sub-pixel information and calculate the phase difference according to the third curve and the fourth curve to perform a focus process.

Please refer to FIG. 26 again. The first position P1 of each lens 170 is a location of the left top corner of the lens 170. The second position P2 of each lens 170 is a location of the right bottom corner of the lens 170. Please note, the first position P1 and the second position P2 shown in FIG. 26 are determined by the distribution examples of the sub-pixels 102 shown in FIG. 26. For the other distributions of the sub-pixels 102, the first position P1 and the second position P2 could correspondingly change. For each color pixel in the pixel array 11 shown in FIG. 26, one sub-pixel 102 (the color sub-pixel A, the color sub-pixel B and the color sub-pixel C) is in the first position P1 of the lens 170 and another sub-pixel 102 (the color sub-pixel A, the color sub-pixel B and the color sub-pixel C) is in the second position P2 of the lens 170. The first color sub-pixel information is outputted by the color sub-pixel in the first position P1 of the lens 170 and the second sub-pixel information is outputted by the color sub-pixel in the second position P2.

For example, the color sub-pixels $A_{12,P1}$, $B_{14,P1}$, $A_{16,P1}$, $B_{18,P1}$, $A_{21,P1}$, $B_{23,P1}$, $A_{25,P1}$, $B_{27,P1}$, etc. are in the first position P1 and the color sub-pixels $A_{12,P2}$, $B_{14,P2}$, $A_{16,P2}$, $B_{18,P2}$, $A_{21,P2}$, $B_{23,P2}$, $A_{25,P2}$, $B_{27,P2}$, etc. are in the second position P2. Multiple color sub-pixels in the first position P1 and multiple color sub-pixels in the second position P2 form a color sub-pixel pair. Correspondingly, multiple first color sub-pixel information and corresponding multiple second first color sub-pixel information form a color sub-pixel information pair.

For example, the multiple first color sub-pixel information and the multiple second color sub-pixel information of the sub-unit form a color sub-pixel information pair. That is, the color sub-pixel information of the color sub-pixels $A_{12,P1}$ and $A_{21,P1}$ and the color sub-pixel information of the color sub-pixels $A_{12,P2}$ and $A_{21,P2}$ form a color sub-pixel information pair. The color sub-pixel information of the color sub-pixels $B_{14,P1}$ and $B_{23,P1}$ and the color sub-pixel information of the color sub-pixels $B_{14,P2}$ and $B_{23,P2}$ form a color sub-pixel information pair. The color sub-pixel information of the color sub-pixels Amyl and $A_{25,P1}$ and the color sub-pixel information of the color sub-pixels $A_{16,P2}$ and $A_{25,P2}$ form a color sub-pixel information pair. The color sub-pixel information of the color sub-pixels $B_{18,P1}$ and $B_{27,P1}$ and the color sub-pixel information of the color sub-pixels $B_{18,P2}$ and $B_{27,P2}$ form a color sub-pixel information pair. And so on. In another embodiment, multiple first color sub-pixel information and multiple second color sub-pixel information in the same smallest repeating unit could form a color sub-pixel information pair. That is, the color sub-pixel information of the color sub-pixels $A_{12,P1}$, $B_{14,P1}$, $A_{21,P1}$, $B_{23,P1}$, $B_{32,P1}$, $C_{34,P1}$, $B_{41,P1}$ and $C_{43,P1}$ and the color sub-pixel information of the color sub-pixels $A_{12,P2}$, $B_{14,P2}$, $A_{21,P2}$, $B_{23,P2}$, $B_{32,P2}$, $C_{34,P2}$, $B_{41,P2}$ and $C_{43,P2}$ form a color sub-pixel information pair.

Please refer to FIG. 27 again. The first position P1 of each lens 170 is a location of the left top corner of the lens 170. The second position P2 of each lens 170 is a location of the right bottom corner of the lens 170. Please note, the first position P1 and the second position P2 shown in FIG. 27 are determined by the distribution examples of the sub-pixels 102 shown in FIG. 27. For the other distributions of the sub-pixels 102, the first position P1 and the second position P2 could correspondingly change. For each color pixel in the pixel array 11 shown in FIG. 27, one sub-pixel 102 (the color sub-pixel A, the color sub-pixel B and the color sub-pixel C) is in the first position P1 of the lens 170 and another sub-pixel 102 (the color sub-pixel A, the color sub-pixel B and the color sub-pixel C) is in the second position P2 of the lens 170. The first color sub-pixel information is outputted by the color sub-pixel in the first position P1 of the lens 170 and the second sub-pixel information is outputted by the color sub-pixel in the second position P2.

For example, the color sub-pixels $A_{12,P1}$, $B_{14,P1}$, $A_{16,P1}$, $B_{18,P1}$, $A_{22,P1}$, $B_{24,P1}$, $A_{26,P1}$, $B_{28,P1}$, etc. are in the first position P1 and the color sub-pixels $A_{12,P2}$, $B_{14,P2}$, $A_{16,P2}$, $B_{18,P2}$, $A_{22,P2}$, $B_{24,P2}$, $A_{26,P2}$, $B_{28,P2}$, etc. are in the second position P2. Multiple color sub-pixels in the first position P1 and multiple color sub-pixels in the second position P2 form a color sub-pixel pair. Correspondingly, multiple first color sub-pixel information and corresponding multiple second first color sub-pixel information form a color sub-pixel information pair.

For example, the multiple first color sub-pixel information and the multiple second color sub-pixel information of the sub-unit form a color sub-pixel information pair. That is, the color sub-pixel information of the color sub-pixels $A_{12,P1}$ and $A_{22,P1}$ and the color sub-pixel information of the color sub-pixels $A_{12,P2}$ and $A_{22,P2}$ form a color sub-pixel information pair. The color sub-pixel information of the color sub-pixels $B_{14,P1}$ and $B_{24,P1}$ and the color sub-pixel information of the color sub-pixels $B_{14,P2}$ and $B_{24,P2}$ form a color sub-pixel information pair. The color sub-pixel information of the color sub-pixels Amyl and $A_{26,P1}$ and the color sub-pixel information of the color sub-pixels $A_{16,P2}$ and $A_{26,P2}$ form a color sub-pixel information pair. The color sub-pixel information of the color sub-pixels $B_{18,P1}$ and $B_{28,P1}$ and the color sub-pixel information of the color sub-pixels $B_{18,P2}$ and $B_{28,P2}$ form a color sub-pixel information pair. And so on. In another embodiment, multiple first color sub-pixel information and multiple second color sub-pixel information in the same smallest repeating unit could form a color sub-pixel information pair. That is, the color sub-pixel information of the color sub-pixels $A_{12,P1}$, $B_{14,P1}$, $A_{22,P1}$, $B_{24,P1}$, $B_{32,P1}$, $C_{34,P1}$, $B_{42,P1}$ and $C_{44,P1}$ and the color sub-pixel information of the color sub-pixels $A_{12,P2}$, $B_{14,P2}$, $A_{22,P2}$, $B_{24,P2}$, $B_{32,P2}$, $C_{34,P2}$, $B_{42,P2}$ and $C_{44,P2}$ form a color sub-pixel information pair.

After obtaining the multiple color sub-pixel information pairs, the processing chip 20 calculates the third color sub-pixel information according to multiple first color sub-pixel information of each color sub-pixel information pair and calculates a fourth color sub-pixel information according to multiple second color sub-pixel information of each color sub-pixel information pair.

For example, for the color sub-pixel information pair comprising the color sub-pixel information of the color sub-pixels $A_{12,P1}$ and $A_{21,P1}$ and the color sub-pixel information of the color sub-pixels $A_{12,P2}$ and $A_{21,P2}$, the calculation of the third color sub-pixel information could be $LT2=A_{12,P1}+A_{21,P1}$, and calculation of the fourth color sub-pixel information could be $LB2=A_{12,P2}+A_{21,P2}$. For the color sub-pixel information pair comprising the color sub-pixel information of the color sub-pixels $A_{12,P1}$, $B_{14,P1}$, $A_{21,P1}$, $B_{23,P1}$, $B_{32,P1}$, $C_{34,P1}$, $B_{41,P1}$ and $C_{43,P1}$ and the color sub-pixel information of the color sub-pixels $A_{12,P2}$, $B_{14,P2}$, $A_{21,P2}$, $B_{23,P2}$, $B_{32,P2}$, $C_{34,P2}$, $B_{41,P2}$ and $C_{43,P2}$, the calculation of the third color sub-pixel information could be $LT2=a*(A_{12,P1}+A_{21,P1})+b*(B_{14,P1}+B_{23,P1}+B_{32,P1}+B_{41,P1})+c*(C_{34,P1}+C_{43,P1})$, and calculation of the fourth color sub-pixel information could be $LB2=a*(A_{12,P2}+A_{21,P2})+b*(B_{14,P2}+B_{23,P2}+B_{32,P2}+B_{41,P2})+C*(C_{34,P1}+C_{43,P2})$. Here, a, b, and c are parameters. The calculations of the third color sub-pixel information and the fourth color sub-pixel information of the other color sub-pixel information pairs are similar and thus omitted here. In this way, the processing chip 20 could obtain multiple third color sub-pixel information and multiple fourth color sub-pixel information. The multiple third color sub-pixel information could be used to depict a histogram curve (the third curve) and the multiple fourth color sub-pixel information could be used to depict a histogram curve (the fourth curve). And then, the processing chip 20 calculates the phase difference according to the two histogram curves. And then, the processing chip could determine the distance that the lens 30 needs to be moved over according to the phase difference and predetermined parameters. At last, the processing chip 20 could control the lens 30 to move over the distance such that the lens could be in the in-focus condition.

Figure 31:
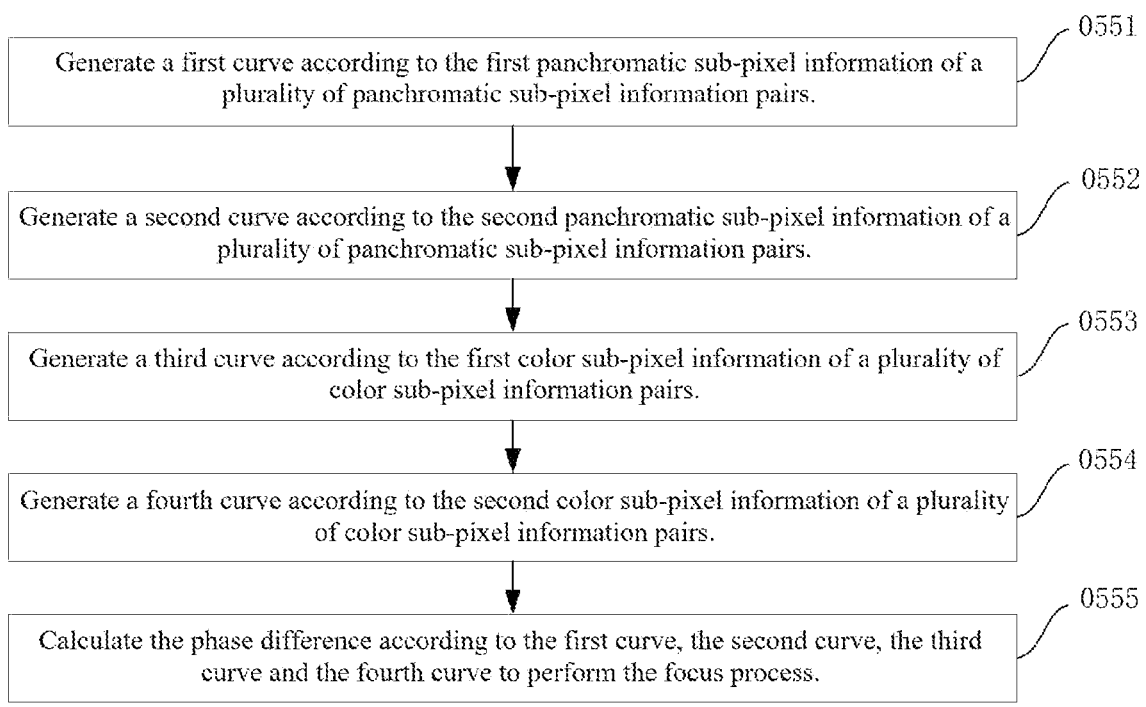

Please refer to FIG. 1 and FIG. 31. In an embodiment, the panchromatic pixel comprises two panchromatic sub-pixels and the color pixel comprises two color sub-pixels. The panchromatic sub-pixel information comprises the first panchromatic sub-pixel information and the second panchromatic sub-pixel information. The color sub-pixel information comprises the first color sub-pixel information and the second color sub-pixel information. The first panchromatic sub-pixel information, the second panchromatic sub-pixel information, the first color sub-pixel information and the second color sub-pixel information are respectively outputted by the panchromatic sub-pixel in the first position of the lens 170, the panchromatic sub-pixel in the second position of the lens 170, the color sub-pixel in the first position of the lens 170 and the color sub-pixel in the second position of the lens 170. A first panchromatic sub-pixel information and a corresponding second panchromatic sub-pixel information form a panchromatic sub-pixel information pair. A first color sub-pixel information and a corresponding second color sub-pixel information form a color sub-pixel information pair. The operation of calculating a phase difference according to the panchromatic sub-pixel information and the color sub-pixel information to perform a focus process comprises operations 0551-0555 as follows:

Operation 0551: Generate a first curve according to the first panchromatic sub-pixel information of a plurality of panchromatic sub-pixel information pairs.

Operation 0552: Generate a second curve according to the second panchromatic sub-pixel information of a plurality of panchromatic sub-pixel information pairs.

Operation 0553: Generate a third curve according to the first color sub-pixel information of a plurality of color sub-pixel information pairs.

Operation 0554: Generate a fourth curve according to the second color sub-pixel information of a plurality of color sub-pixel information pairs.

Operation 0555: Calculate the phase difference according to the first curve, the second curve, the third curve and the fourth curve to perform the focus process.

Please refer to FIG. 23. In an embodiment, the operations 0551-0555 could be achieved by the processing chip 20. That is, the processing chip 20 could be used to form the first curve according to the first panchromatic sub-pixel information of a plurality of panchromatic sub-pixel information pairs, to form the second curve according to the second panchromatic sub-pixel information of a plurality of panchromatic sub-pixel information pairs, to form the third curve according to the first color sub-pixel information of a plurality of color sub-pixel information pairs, to form the fourth curve according to the second color sub-pixel information of a plurality of color sub-pixel information pairs, and to calculate the phase difference according to the first curve, the second curve, the third curve and the fourth curve to perform the focus process.

The first position and the second position are similar to the first position P1 and the second position P2 in the embodiments shown in FIG. 25 and FIG. 29 and thus further illustration is omitted here. The panchromatic sub-pixel information and the color sub-pixel information are similar to the panchromatic sub-pixel information and the color sub-pixel information in the embodiments shown in FIG. 25 and FIG. 29 and thus further illustration is omitted here.

After obtaining a plurality of panchromatic sub-pixel information pairs and a plurality of color sub-pixel information pairs, the processing chip 20 forms the first curve according to the first panchromatic sub-pixel information of the panchromatic sub-pixel information pairs, forms the second curve according to the second panchromatic sub-pixel information of the panchromatic sub-pixel information pairs, forms the third curve according to the first color sub-pixel information of the color sub-pixel information pairs and forms the fourth curve according to the second color sub-pixel information of the color sub-pixel information pairs. And then, the processing chip 20 calculates a first phase difference according to the first curve and the second curve and calculates a second phase difference according to the third curve and the fourth curve. In an embodiment, the processing chip 20 could calculate the average of the first phase difference and the second phase difference as the final phase difference. In another embodiment, the processing chip could assign a first weight to the first phase difference and assign a second weight to the second phase difference. The first weight and the second weight are different. And then, the processing chip 20 could calculate the final phase difference according to the first phase difference, the first weight, the second phase difference and the second weight. And then, the processing chip 20 could determine the distance that the lens should move over according to the final phase difference and the predetermined parameters. And then, the processing chip 20 could control the lens to move over the calculated distance such that the lens 30 could be in the in-focus condition.

Figure 32:
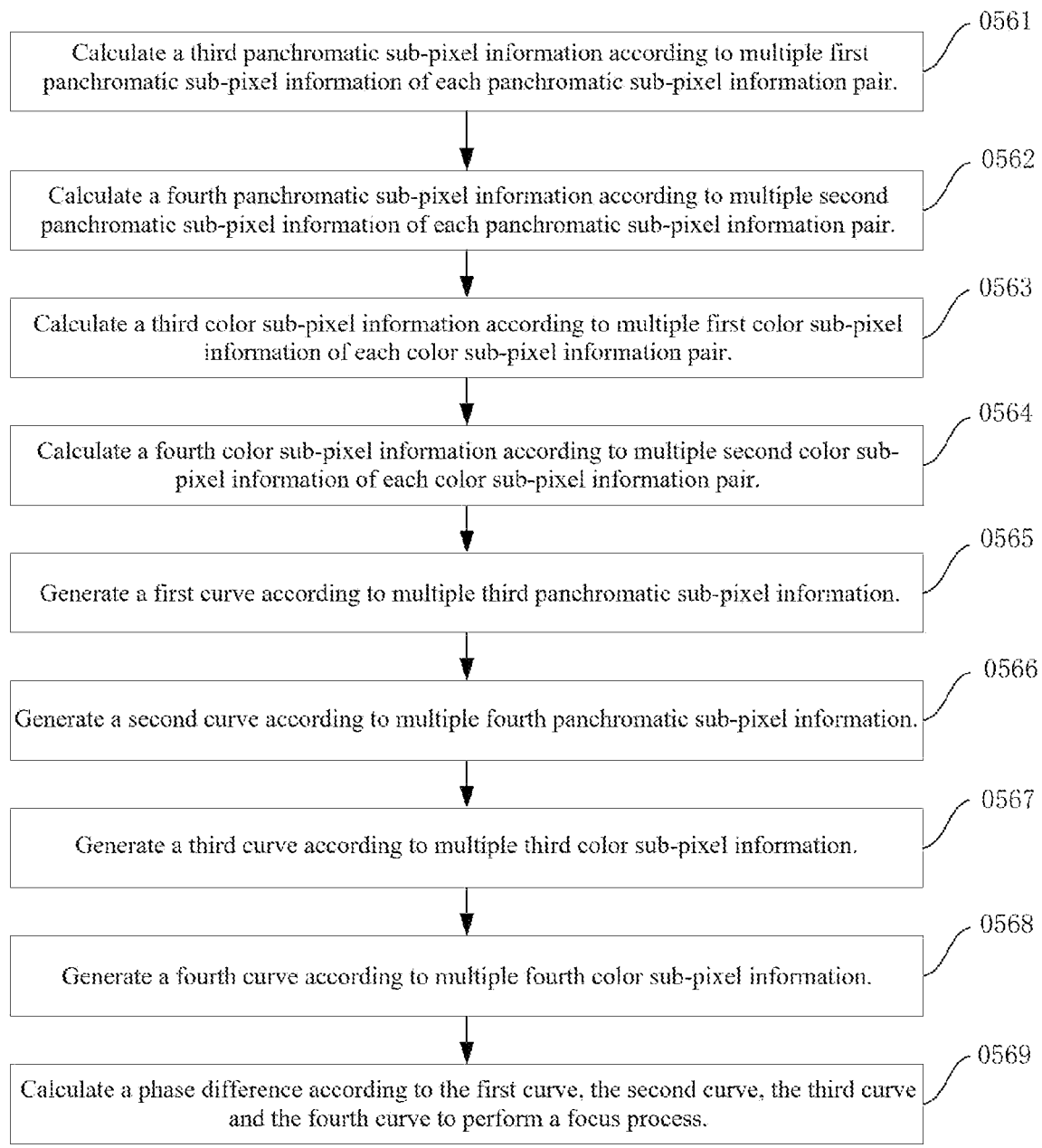

Please refer to FIG. 1 and FIG. 32. In an embodiment, the panchromatic pixel comprises two panchromatic sub-pixels and the color pixel comprises two color sub-pixels. The panchromatic sub-pixel information comprises the first panchromatic sub-pixel information and the second panchromatic sub-pixel information. The color sub-pixel information comprises the first color sub-pixel information and the second color sub-pixel information. The first panchromatic sub-pixel information, the second panchromatic sub-pixel information, the first color sub-pixel information and the second color sub-pixel information are respectively outputted by the first panchromatic sub-pixel in the first position of the lens 170 and the second panchromatic sub-pixels in the second position of the lens 170, the first color sub-pixel in the first position of the lens 170 and the second color sub-pixels in the second position of the lens 170. Multiple first panchromatic sub-pixel information and corresponding multiple second panchromatic sub-pixel information form a panchromatic sub-pixel information pair. Multiple first color sub-pixel information and corresponding multiple second color sub-pixel information form a color sub-pixel information pair. The operation of calculating the phase difference according to the panchromatic sub-pixel information and the color sub-pixel information to perform the focus process comprises operations 0561-0569 as follows:

Operation 0561: calculate a third panchromatic sub-pixel information according to multiple first panchromatic sub-pixel information of each panchromatic sub-pixel information pair.

Operation 0562: calculate a fourth panchromatic sub-pixel information according to multiple second panchromatic sub-pixel information of each panchromatic sub-pixel information pair.

Operation 0563: calculate a third color sub-pixel information according to multiple first color sub-pixel information of each color sub-pixel information pair.

Operation 0564: calculate a fourth color sub-pixel information according to multiple second color sub-pixel information of each color sub-pixel information pair.

Operation 0565: generate a first curve according to multiple third panchromatic sub-pixel information.

Operation 0566: generate a second curve according to multiple fourth panchromatic sub-pixel information.

Operation 0567: generate a third curve according to multiple third color sub-pixel information.

Operation 0568: generate a fourth curve according to multiple fourth color sub-pixel information.

Operation 0569: calculate a phase difference according to the first curve, the second curve, the third curve and the fourth curve to perform a focus process.

Please refer to FIG. 23. In an embodiment, the operations 0561-0567 could be achieved by the processing chip 20. That is, the processing chip 20 could be used to calculate a third panchromatic sub-pixel information according to multiple first panchromatic sub-pixel information of each panchromatic sub-pixel information pair, calculate a fourth panchromatic sub-pixel information according to multiple second panchromatic sub-pixel information of each panchromatic sub-pixel information pair, calculate a third color sub-pixel information according to multiple first color sub-pixel information of each color sub-pixel information pair, and calculate a fourth color sub-pixel information according to multiple second color sub-pixel information of each color sub-pixel information pair.

In addition, the processing chip 20 could be further used to form the first curve according to the first panchromatic sub-pixel information of a plurality of panchromatic sub-pixel information pairs, to form the second curve according to the second panchromatic sub-pixel information of a plurality of panchromatic sub-pixel information pairs, to form the third curve according to the first color sub-pixel information of a plurality of color sub-pixel information pairs, to form the fourth curve according to the second color sub-pixel information of a plurality of color sub-pixel information pairs. The processing chip 20 could be further used to calculate the phase difference according to the first curve, the second curve, the third curve and the fourth curve to perform the focus process.

The first position and the second position are similar to the first position P1 and the second position P2 in the embodiments shown in FIG. 28 and FIG. 30 and thus further illustration is omitted here. The panchromatic sub-pixel information pair and the color sub-pixel information pair are similar to the panchromatic sub-pixel information pair and the color sub-pixel information pair in the embodiments shown in FIG. 28 and FIG. 30 and thus further illustration is omitted here. The calculations of the third panchromatic sub-pixel information and the fourth panchromatic sub-pixel information are similar to the calculations of the third panchromatic sub-pixel information and the fourth panchromatic sub-pixel information in the embodiments shown in FIG. 28 and FIG. 30 and thus further illustration is omitted here. The calculations of the third color sub-pixel information and the fourth color sub-pixel information are similar to the calculations of the third color sub-pixel information and the fourth color sub-pixel information in the embodiments shown in FIG. 28 and FIG. 30 and thus further illustration is omitted here.

After obtaining a plurality of third panchromatic sub-pixel information a plurality of fourth panchromatic sub-pixel information, a plurality of third color sub-pixel information and a plurality of fourth color sub-pixel information, the processing chip 20 forms the first curve according to the multiple third panchromatic sub-pixel information, forms the second curve according to the multiple fourth panchromatic sub-pixel information, forms the third curve according to multiple third color sub-pixel information and forms the fourth curve according to the multiple fourth color sub-pixel information. And then, the processing chip 20 calculates a first phase difference according to the first curve and the second curve and calculates a second phase difference according to the third curve and the fourth curve. In an embodiment, the processing chip 20 could calculate the average of the first phase difference and the second phase difference as the final phase difference. In another embodiment, the processing chip could assign a first weight to the first phase difference and assign a second weight to the second phase difference. The first weight and the second weight are different. And then, the processing chip 20 could calculate the final phase difference according to the first phase difference, the first weight, the second phase difference and the second weight. And then, the processing chip 20 could determine the distance that the lens should move over according to the final phase difference and the predetermined parameters. And then, the processing chip 20 could control the lens to move over the calculated distance such that the lens 30 could be in the in-focus condition.

Figure 33:
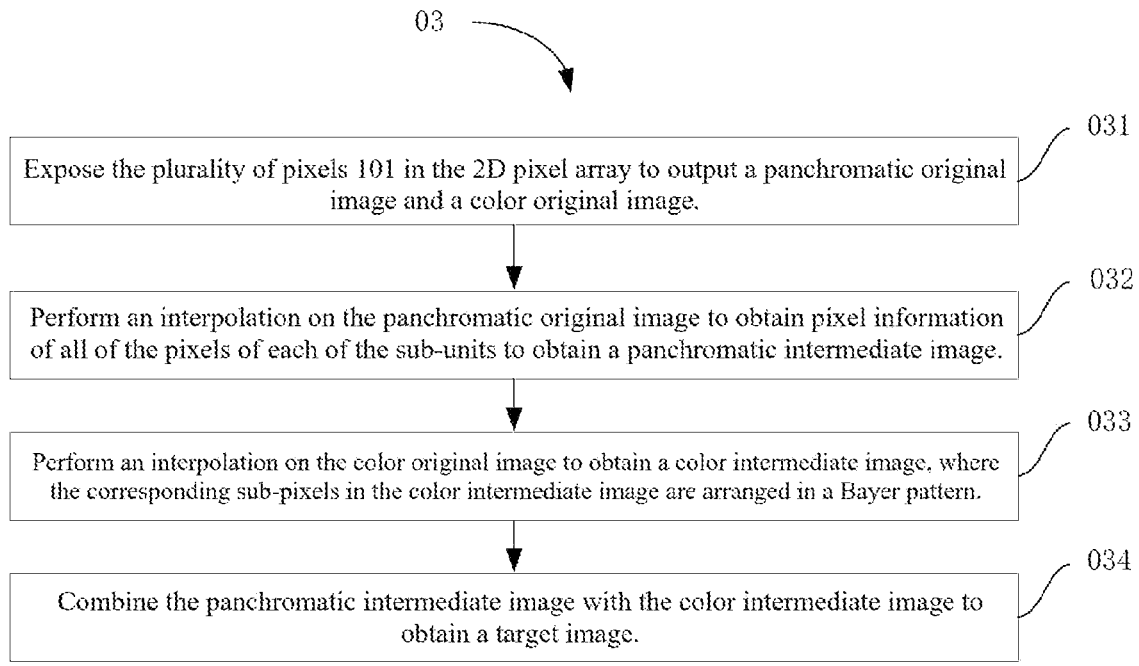

Please refer to FIG. 1, FIG. 3 and FIG. 33. In an embodiment, the pixels 101 comprise a plurality of panchromatic pixels and a plurality of color pixels. The color pixels have a spectrum response narrower than that of the panchromatic pixels. The 2D pixel array 11 comprises a smallest repeating unit. Each smallest repeating unit comprises a plurality of sub-units. Each sub-unit comprises a plurality of single-color pixels and a plurality of panchromatic pixels. The operation 03 of exposing multiple pixels 101 in the 2D pixel array 11 to obtain the target image comprises operations 031-034 as follows:

Operation 031: expose the plurality of pixels 101 in the 2D pixel array to output a panchromatic original image and a color original image.

Operation 032: perform an interpolation on the panchromatic original image to obtain pixel information of all of the pixels of each of the sub-units to obtain a panchromatic intermediate image.

Operation 033: perform an interpolation on the color original image to obtain a color intermediate image, where the corresponding sub-pixels in the color intermediate image are arranged in a Bayer pattern.

Operation 034: combine the panchromatic intermediate image with the color intermediate image to obtain a target image.

Please refer to FIG. 1 and FIG. 23. In an embodiment, the operation 031 could be achieved by the image sensor 10. The operations 032-034 could be achieved by the processing chip 20. That is, the multiple pixels 101 in the 2D pixel array 11 in the image sensor 10 are exposed to output the panchromatic original image and the color original image. The processing chip 20 could be used to perform an interpolation on the panchromatic original image to obtain pixel information of all of the pixels of each of the sub-units to obtain a panchromatic intermediate image. The processing chip 20 could be further used to perform an interpolation on the color original image to obtain a color intermediate image. Here, the corresponding sub-pixels in the color intermediate image are arranged in a Bayer pattern. The processing chip 20 could be further used to combine the panchromatic intermediate image with the color intermediate image to obtain a target image.

The pixel information of the pixels 101 (the panchromatic pixels or the color pixels) represents: (1) when the pixel 101 comprises only one sub-pixel 102, the sub-pixel information of the sub-pixel 102 is regarded as the pixel information of the pixel 101; (2) when the pixel 101 comprises two sub-pixels 102, the sum of the sub-pixel information of the two sub-pixels is regarded as the pixel information of the pixel 101.

Figure 34:
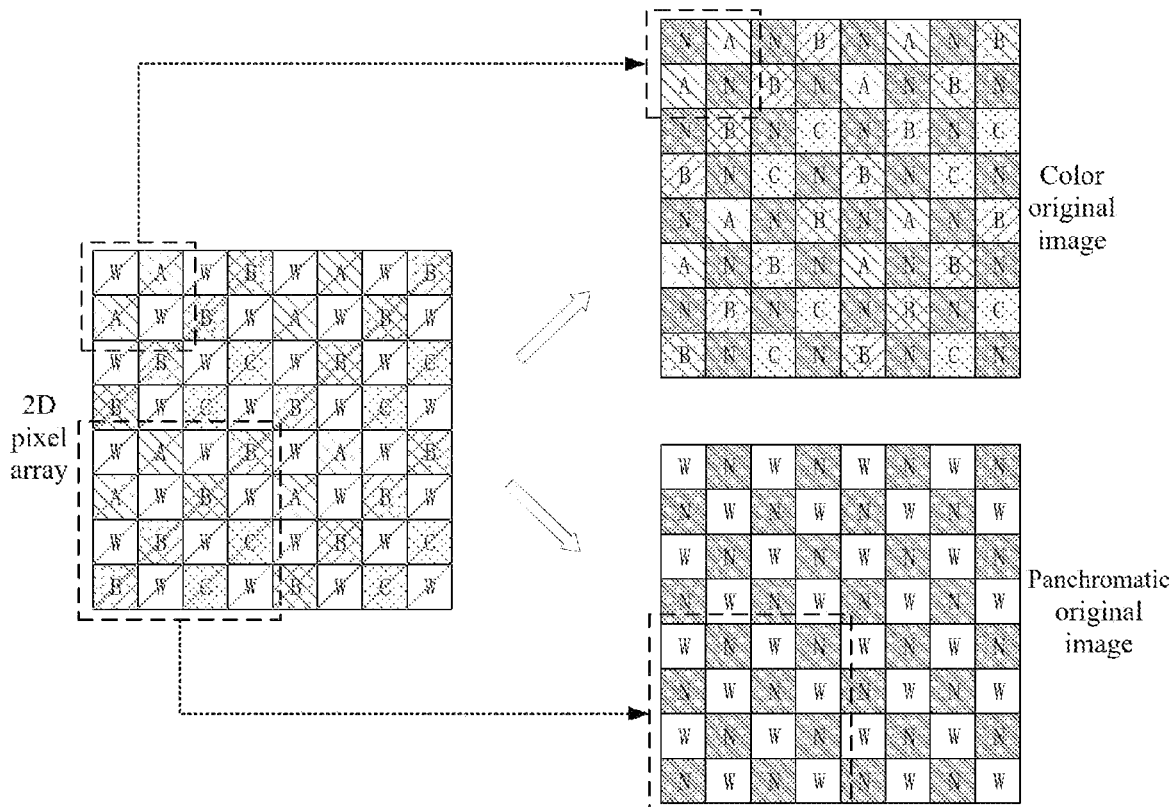
FIGS. 34-37 depict the theory of a control method according to an embodiment of the present disclosure.

Please refer to FIG. 34. Specifically, multiple panchromatic pixels are exposed to output a frame of a panchromatic original image and multiple color pixels are exposed to output a frame of a color original image.

The panchromatic original image comprises a plurality of panchromatic pixels W and a plurality of null pixels N (Null). Here, the null pixels are neither panchromatic pixels nor color pixels. In the panchromatic original image, the positions of the null pixels could represent that there is no pixel in the positions. Or, the pixel information of the null pixels could be regarded as 0. Comparing the 2D pixel array with the panchromatic original image, it could be known that each sub-unit in the 2D pixel array 11 comprises two panchromatic pixels W and two color pixels (the color pixel A, the color pixel B or the color pixel C). The panchromatic original image also comprises a sub-unit corresponding to each sub-unit of the 2D pixel array 11. The sub-unit of the panchromatic original image comprises two panchromatic pixels W and two null pixels N. The positions of the two null pixels N correspond to the positions of the two color pixels of the sub-unit of the 2D pixel array 11.

Similarly, the color original image comprises a plurality of color pixels and a plurality of null pixels N. Here, the null pixels are neither panchromatic pixels nor color pixels. In the color original image, the positions of the null pixels could represent that there is no pixel in the positions. Or, the pixel information of the null pixels could be regarded as 0. Comparing the 2D pixel array 11 with the color original image, it could be known that each sub-unit in the 2D pixel array 11 comprises two panchromatic pixels W and two color pixels. The color original image also comprises a sub-unit corresponding to each sub-unit of the 2D pixel array 11. The sub-unit of the color original image comprises two color pixels and two null pixels N. The positions of the two null pixels N correspond to the positions of the two panchromatic pixels of the sub-unit of the 2D pixel array 11.

After the processing chip 20 receives the panchromatic original image and the color original image outputted by the image sensor 10, the processing chip 20 could further process the panchromatic original image to obtain a panchromatic intermediate image and process the color original image to obtain a color intermediate image.

Figure 35:
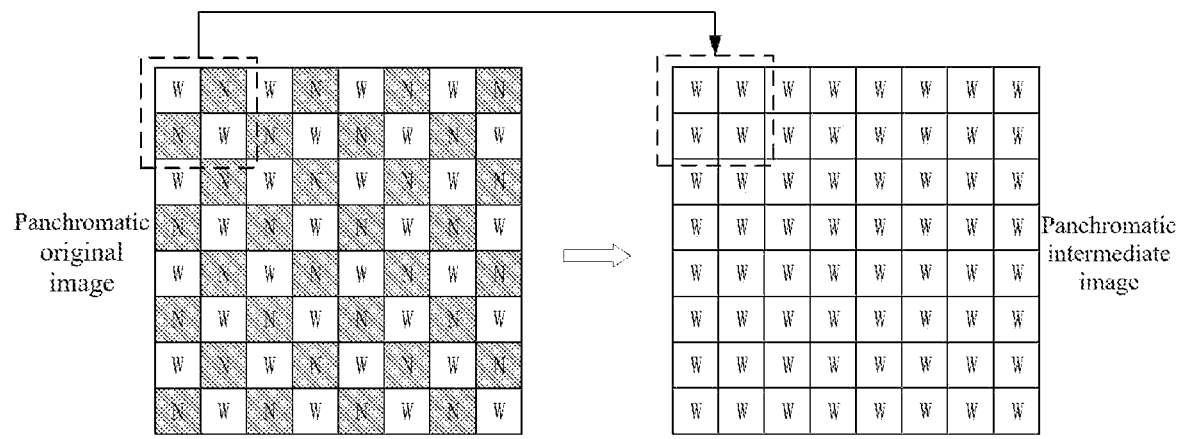

The panchromatic original image could be transformed into the panchromatic intermediate image by the method shown in FIG. 35. Specifically, the panchromatic original image comprises a plurality of sub-units. Each sub-unit comprises two null pixels N and two panchromatic pixels W. The processing chip 20 needs to replace each null pixel N with a panchromatic pixel W in each sub-unit and calculates the pixel information of each panchromatic pixel W in the positions of the null pixels after the replacement. For each null pixel N, the processing chip 20 replaces the null pixel N with a panchromatic pixel W and determine the pixel information of the added panchromatic pixel W according to the pixel information of the panchromatic pixels W adjacent to the added panchromatic pixel W. As shown in FIG. 35, taking the null pixel $N_{1,8}$ ("the null pixel $N_{1,8}$" represents the null pixel N in the first row and eighth column) in the panchromatic original image as an example, the null pixel $N_{1,8}$ is replaced with the panchromatic pixel $W_{1,8}$. The panchromatic pixels adjacent to the panchromatic pixel $W_{1,8}$ are, for example, the panchromatic pixels $W_{1,7}$ and $W_{2,8}$. In this case, the average of the pixel information of the panchromatic pixel $W_{1,7}$ and the pixel information of the panchromatic pixel $W_{2,8}$ could be taken as the pixel information of the panchromatic pixel $W_{1,8}$. Taking the null pixel $N_{2,3}$ in the panchromatic original image shown in FIG. 35, the null pixel $N_{2,3}$ is replaced by the panchromatic pixel $W_{2,3}$. The panchromatic pixels adjacent to the panchromatic pixel $W_{2,3}$ are, for example, the panchromatic pixels $W_{1,3}$, $W_{2,2}$, $W_{2,4}$ and $W_{3,3}$. The processing chip 20 take the average of the pixel information of the panchromatic pixels $W_{1,3}$, $W_{2,2}$, $W_{2,4}$ and $W_{3,3}$ as the pixel information of the added panchromatic pixel $W_{2,3}$.

Figure 36:
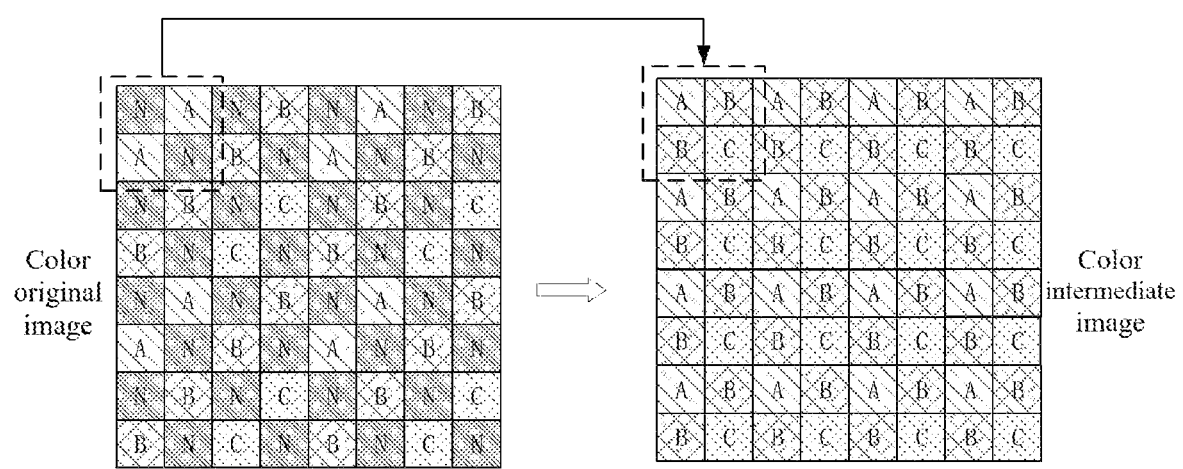

The color original image could be transformed into the color intermediate image by the method shown in FIG. 36. Specifically, the color original image comprises a plurality of sub-units. Each sub-unit comprises two single-color color pixels (the single-color pixel A, the single-color pixel B or the single-color pixel C). Specifically, some sub-units comprise two null pixels N and two single-color pixels A. Some sub-units comprise two null pixels N and two single-color pixels B. Some sub-units comprise two null pixels N and two single-color pixels C. The processing chip 20 firstly determines the distribution of the Bayer array of each sub-unit, such as the ABBC distribution shown in FIG. 36 (it could be CBBA, BABC, BCBA, etc.). Taking the sub-unit at the left top corner, the processing chip 20 replaces the null pixel $N_{1,1}$ with the panchromatic pixel $A_{1,1}$, replaces the color pixel $A_{1,2}$ with the color pixel $B_{1,2}$, replaces the color pixel $A_{2,1}$ with the color pixel $B_{2,1}$, and replaces the null pixel $N_{2,2}$ with the color pixel $C_{2,2}$. Furthermore, the processing chip further calculates the pixel information of the color pixel $A_{1,1}$, the pixel information of the color pixel $B_{1,2}$, the pixel information of the color pixel $B_{2,1}$ and pixel information of the color pixel $C_{2,2}$, In this way, the processing chip 20 could obtain a frame of a color intermediate image.

After the processing chip 20 obtains the panchromatic intermediate image and the color intermediate image, the processing chip 20 could combine the panchromatic intermediate image with the color intermediate image to obtain the target image.

Figure 37:
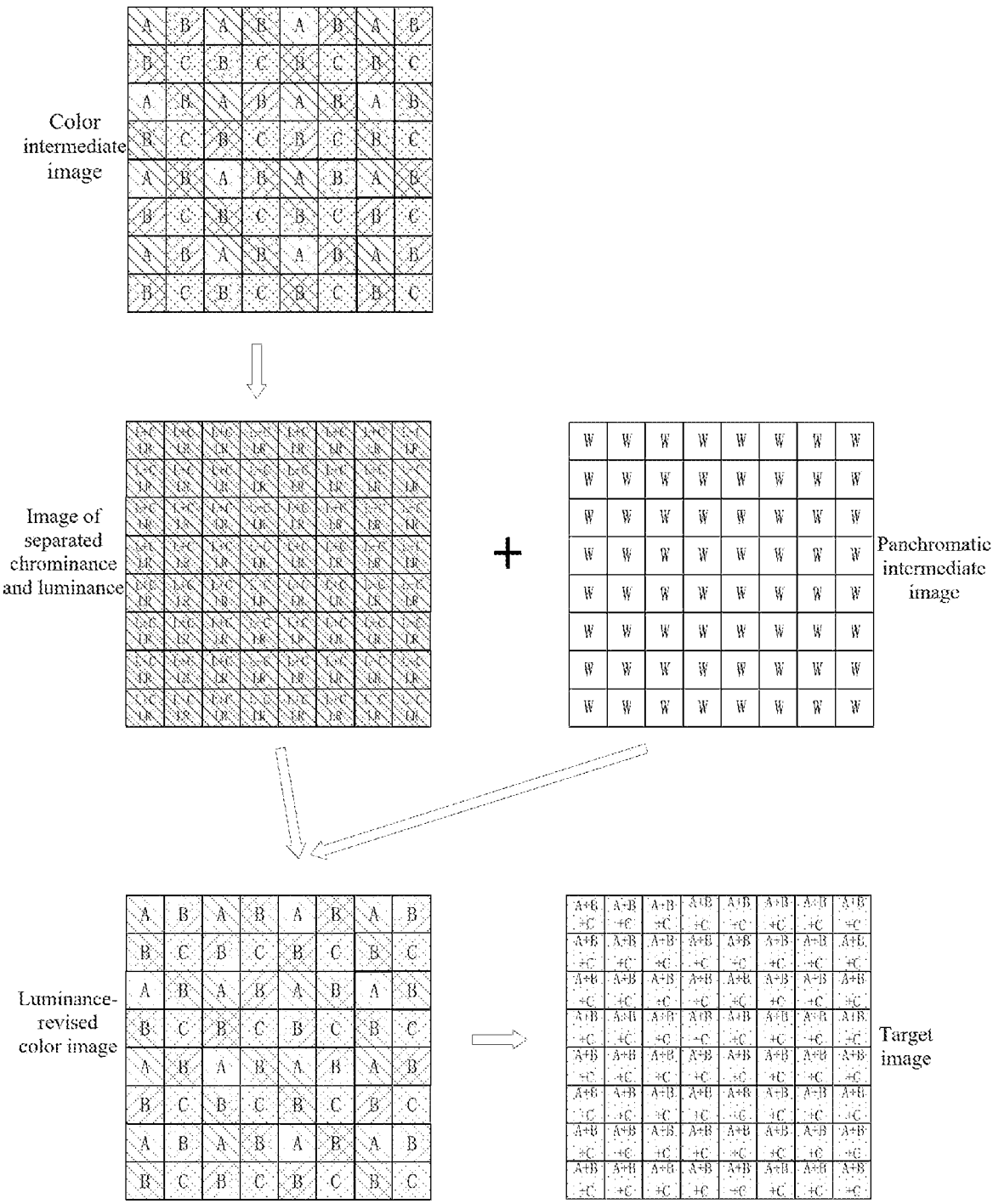

The panchromatic intermediate image and the color intermediate image could be combined by the method shown in FIG. 37 to obtain the target image. Specifically, the processing chip 20 first separates the chrominance and luminance in the color intermediate image to obtain an image of separated chrominance and luminance. In the image of separated chrominance and luminance shown in FIG. 37, L represents luminance and CLR represents the chrominance. Specifically, if the single-color pixel A is a red pixel R, the single-color pixel B is a green pixel G, and the single-color pixel C is a blue pixel Bu, then: (1) the processing chip 20 could transform the color intermediate image of RGB domain into the image of separated chrominance and luminance of YCrCb domain. Here, Y represents the luminance and Cr and Cb represent the color chrominance CLR; (2) the processing chip 20 could also transform the color intermediate image of RGB domain into the image of separated chrominance and luminance of Lab domain. Here, L represents the luminance and a and b represent the color chrominance CLR. It should be noted that in the image of separated chrominance and luminance shown in FIG. 37, L+CLR does not represent that the pixel information of each pixel is obtained by adding the values of L and CLR. It merely means that the pixel information of each pixel is composed of L and CLR.

And then, the processing chip 20 combines the luminance of the image of separated luminance and chrominance with the luminance of the panchromatic intermediate image.

For example, the pixel information of each panchromatic pixel W in the panchromatic intermediate image is the luminance information of each panchromatic pixel. The processing chip 20 could add the L of each of the pixel in the image of separated luminance and chrominance and the W of the panchromatic pixel of the corresponding position in the panchromatic intermediate image to obtain the pixel information with the revised luminance. The processing chip 20 form a luminance-revised image of separated luminance and chrominance according to the luminance-revised pixel information and uses the color space transformation to transform the luminance-revised image of separated luminance and chrominance back to a luminance-revised color image.

And then, the processing chip 20 performs an interpolation on the luminance-revised color image to obtain the target image. Here, the pixel information of each pixel of the target image comprises pixel information of A, B and C. Please note, A+B+C in the target image shown in FIG. 37 represents that the pixel information of each pixel is composed of A, B and C portions of the pixel information.

According to an embodiment, the control method and the camera component 40 obtain a panchromatic original image and a color original image when the lens 30 is in the in-focus condition and use the luminance of the panchromatic original image to revise the luminance of the color original image. In this way, the target image could have a better clearance and enough luminance, which means that the target image has a better quality.

Figure 38:
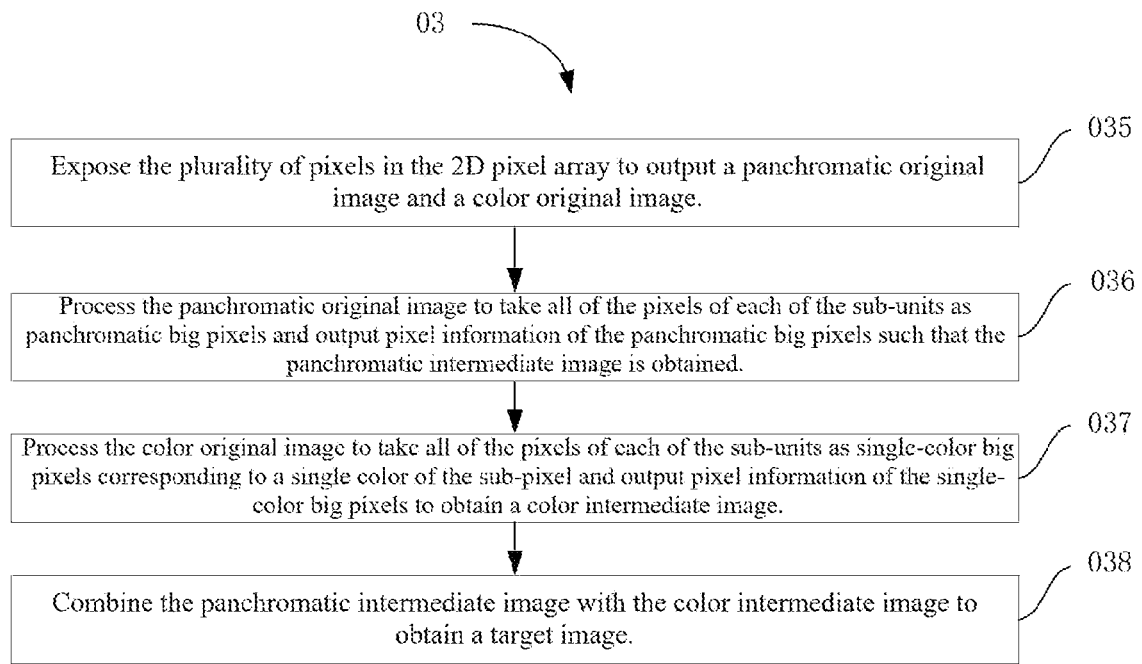
FIG. 38 is a flow chart of a control method according to an embodiment of the present disclosure.

Please refer to FIG. 1, FIG. 3 and FIG. 38. In an embodiment, the pixels 101 comprise a plurality of panchromatic pixels and a plurality of color pixels. The color pixels have a spectrum response narrower than that of the panchromatic pixels. The 2D pixel array 11 comprises a smallest repeating unit. Each smallest repeating unit comprises a plurality of sub-units. Each sub-unit comprises a plurality of single-color pixels and a plurality of panchromatic pixels. The operation 03 of exposing multiple pixels 101 in the 2D pixel array 11 to obtain the target image comprises operations 035-038 as follows:

Operation 035: expose the plurality of pixels 101 in the 2D pixel array to output a panchromatic original image and a color original image.

Operation 036: process the panchromatic original image to take all of the pixels of each of the sub-units as panchromatic big pixels and output pixel information of the panchromatic big pixels such that the panchromatic intermediate image is obtained.

Operation 037: process the color original image to take all of the pixels of each of the sub-units as single-color big pixels corresponding to a single color of the sub-pixel and output pixel information of the single-color big pixels to obtain a color intermediate image.

Operation 038: combine the panchromatic intermediate image with the color intermediate image to obtain a target image.

Please refer to FIG. 1 and FIG. 23. In an embodiment, the operation 035 could be achieved by the image sensor 10. The operations 036-038 could be achieved by the processing chip 20. That is, the multiple pixels 101 in the 2D pixel array 11 in the image sensor 10 are exposed to output the panchromatic original image and the color original image. The processing chip 20 could be used to process the panchromatic original image to take all of the pixels of each of the sub-units as panchromatic big pixels and output pixel information of the panchromatic big pixels such that the panchromatic intermediate image is obtained. The processing chip 20 could be further used to process the color original image to take all of the pixels of each of the sub-units as single-color big pixels corresponding to a single color of the sub-pixel and output pixel information of the single-color big pixels to obtain a color intermediate image. The processing chip 20 could be further used to combine the panchromatic intermediate image with the color intermediate image to obtain a target image.

Please refer to FIG. 34. Specifically, multiple panchromatic pixels are exposed to output a frame of a panchromatic original image and multiple color pixels are exposed to output a frame of a color original image.

After the processing chip 20 receives the panchromatic original image and the color original image outputted by the image sensor 10, the processing chip 20 could further process the panchromatic original image to obtain a panchromatic intermediate image and process the color original image to obtain a color intermediate image.

Figure 39:
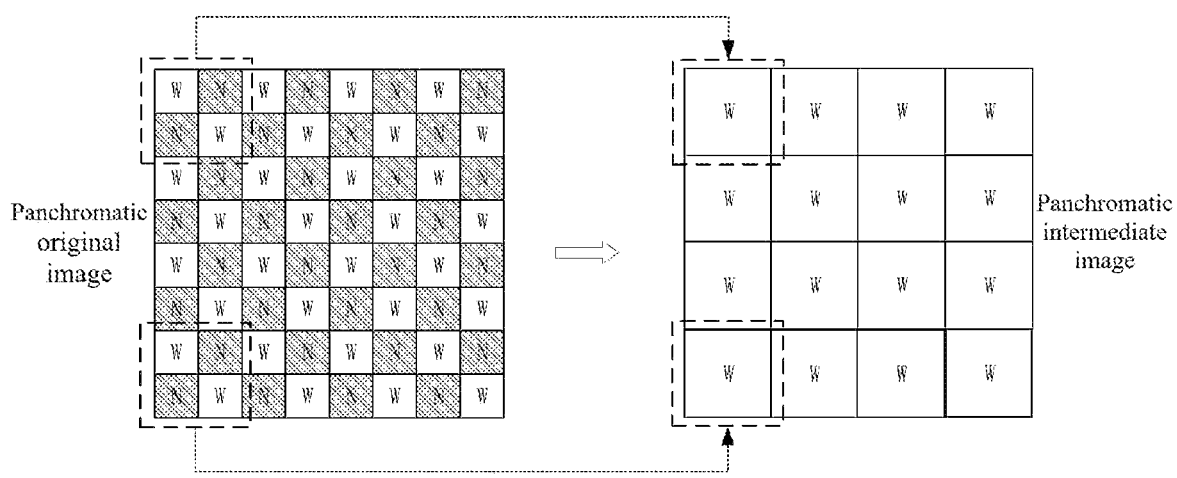
FIGS. 39-41 depict the theory of a control method according to an embodiment of the present disclosure.

For example, the panchromatic original image could be transformed into the panchromatic intermediate image by the method shown in FIG. 39. As shown in FIG. 39, the panchromatic original image comprises a plurality of sub-units. Each sub-unit comprises two null pixels N and two panchromatic pixels W. The processing chip 20 could take all pixels 101 comprising the null pixels N and the panchromatic pixels W in the sub-unit as a panchromatic big pixel W corresponding to the sub-unit. And then, the processing chip 20 could form a panchromatic intermediate image according to multiple panchromatic big pixels W. In an embodiment, the processing chip could use the following method to take all pixels in each sub-unit of the panchromatic original image as the panchromatic big pixels W corresponding to the panchromatic big pixel W: the processing chip 20 firstly combines all the pixel information of all pixels in each sub-unit to obtain the pixel information of the panchromatic big pixels W and then form the panchromatic intermediate image according to the pixel information of multiple panchromatic big pixels W. Specifically, for each panchromatic big pixel, the processing chip 20 could add all pixel information of all pixels comprising null pixels N and the panchromatic pixels W in a sub-unit together and take the adding result as the pixel information of the panchromatic big pixel corresponding to the sub-unit. Here, the pixel information of the null pixels could be regarded as 0. Accordingly, the processing chip 20 could obtain the pixel information of the multiple panchromatic big pixels W.

Figure 40:
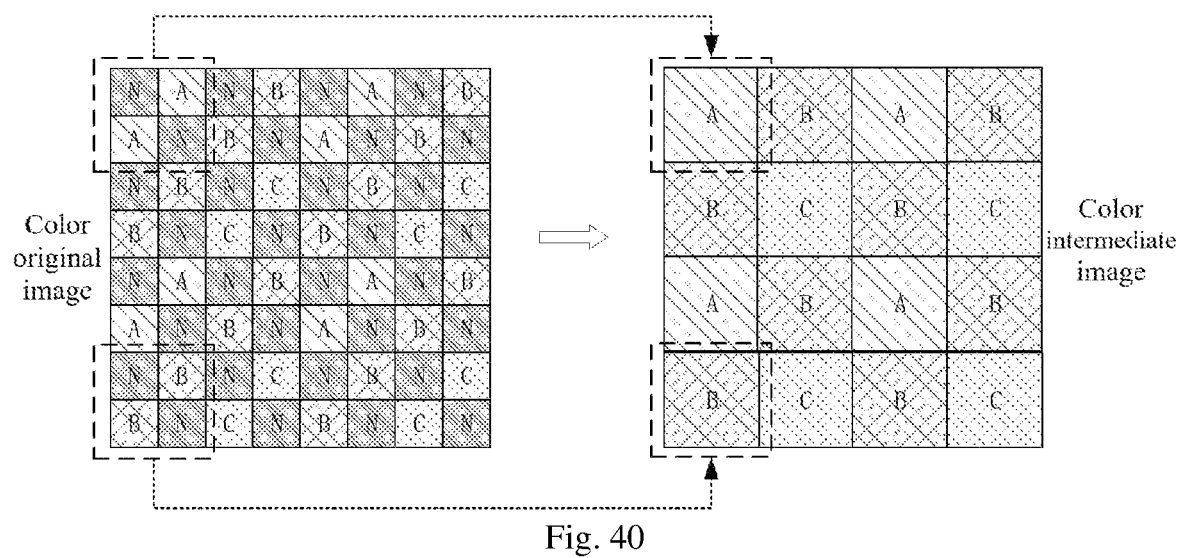

For example, the color original image could be transformed into the color intermediate image by the method shown in FIG. 40. As shown in FIG. 40, the color original image comprises a plurality of sub-units. Each sub-unit comprises a plurality of null pixels N and a plurality of single-color color pixels (also called single-color pixels). Specifically, some sub-units comprise two null pixels N and two single-color pixels A. Some sub-units comprise two null pixels N and two single-color pixels B. Some sub-units comprise two null pixels N and two single-color pixels C. The processing chip 20 could take all pixels 101 comprising the null pixels N and the single-color pixels A in the sub-unit as a color big pixel A corresponding to the sub-unit, take all pixels 101 comprising the null pixels N and the single-color pixels B in the sub-unit as a color big pixel B corresponding to the sub-unit, and take all pixels 101 comprising the null pixels N and the single-color pixels C in the sub-unit as a color big pixel C corresponding to the sub-unit. And then, the processing chip 20 could form a color intermediate image according to multiple color big pixels A, multiple color big pixels B and multiple color big pixels C. In an embodiment, the processing chip 20 could combine all the pixel information of all pixels in each sub-unit to obtain the pixel information of the single-color big pixels W and then form the color intermediate image according to the pixel information of multiple color big pixels. Specifically, for each single-color big pixel A, the processing chip 20 could add all pixel information of all pixels comprising null pixels N and the single-color pixels A in a sub-unit together and take the adding result as the pixel information of the color big pixel A corresponding to the sub-unit. Here, the pixel information of the null pixels N could be regarded as 0. Similarly, the processing chip 20 could add all pixel information of all pixels comprising null pixels N and the single-color pixels B in a sub-unit together and take the adding result as the pixel information of the color big pixel B corresponding to the sub-unit. The processing chip 20 could add all pixel information of all pixels comprising null pixels N and the single-color pixels C in a sub-unit together and take the adding result as the pixel information of the color big pixel C corresponding to the sub-unit. Accordingly, the processing chip 20 could obtain the pixel information of the multiple single-color big pixels A, obtain the pixel information of the multiple single-color big pixels B, and obtain the pixel information of the multiple single-color big pixels C. And then, the processing chip 20 could form a color intermediate image according to the pixel information of multiple single-color big pixels A, multiple single-color big pixels B and multiple single-color big pixels C.

After the processing unit 20 obtains the panchromatic intermediate image and the color intermediate image, the processing unit 20 combines the panchromatic intermediate image with the color intermediate image to obtain the target image.

Figure 41:
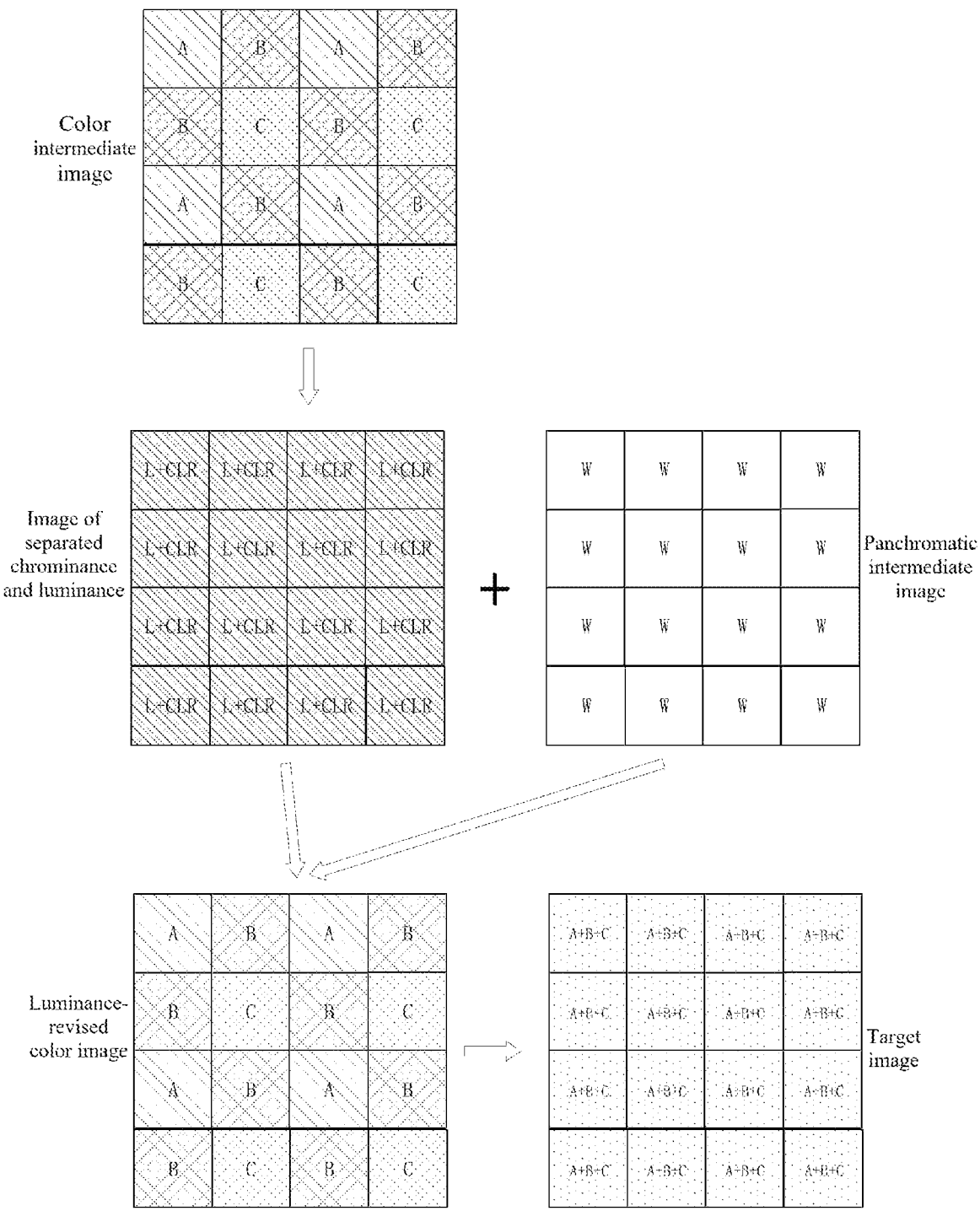

For example, the panchromatic intermediate image and the color intermediate image could be combined by the method shown in FIG. 41 to obtain the target image. Specifically, the processing chip 20 first separates the chrominance and luminance in the color intermediate image to obtain an image of separated chrominance and luminance. In the image of separated chrominance and luminance shown in FIG. 34, L represents luminance and CLR represents the chrominance. Specifically, if the single-color pixel A is a red pixel R, the single-color pixel B is a green pixel G, and the single-color pixel C is a blue pixel Bu, then: (1) the processing chip 20 could transform the color intermediate image of RGB domain into the image of separated chrominance and luminance of YCrCb domain. Here, Y represents the luminance and Cr and Cb represent the color chrominance CLR; (2) the processing chip 20 could also transform the color intermediate image of RGB domain into the image of separated chrominance and luminance of Lab domain. Here, L represents the luminance and a and b represent the color chrominance CLR. It should be noted that in the image of separated chrominance and luminance shown in FIG. 37, L+CLR does not represent that the pixel information of each pixel is obtained by adding the values of L and CLR. It merely means that the pixel information of each pixel is composed of L and CLR.

And then, the processing chip 20 combines the luminance of the image of separated luminance and chrominance with the luminance of the panchromatic intermediate image.

For example, the pixel information of each panchromatic big pixel W in the panchromatic intermediate image is the luminance information of each panchromatic big pixel. The processing chip 20 could add the L of each of the single-color pixels in the image of separated luminance and chrominance and the W of the panchromatic big pixel of the corresponding position in the panchromatic intermediate image to obtain the pixel information with the revised luminance. The processing chip 20 form a luminance-revised image of separated luminance and chrominance according to the luminance-revised pixel information and uses the color space transformation to transform the luminance-revised image of separated luminance and chrominance back to a luminance-revised color image.

And then, the processing chip 20 performs an interpolation on the luminance-revised color image to obtain the target image. Here, the pixel information of each pixel of the target image comprises pixel information of A, B and C. Please note, A+B+C in the target image shown in FIG. 41 represents that the pixel information of each pixel is composed of A, B and C portions of the pixel information.

According to an embodiment, the control method and the camera component 40 obtain a panchromatic original image and a color original image when the lens 30 is in the in-focus condition and use the luminance of the panchromatic original image to revise the luminance of the color original image. In this way, the target image could have a better clearance and enough luminance, which means that the target image has a better quality.

The target image obtained according to the method shown in FIG. 33 has a resolution higher than the resolution of the target image obtained according to the method shown in FIG. 38. In an embodiment, the processing chip 20 could choose one of the methods to calculate the target image according to the ambient luminance.

For example, when the ambient luminance is higher (for example, higher than or equal to the first predetermined luminance), the control method shown in FIG. 33 is adopted to calculate the target image. In this way, a target image with a higher resolution and a better luminance could be obtained. When the ambient luminance is lower, the control method shown in FIG. 38 is adopted to calculate the target image. In this way, the target image could have enough luminance.

During the pixels in the 2D pixel array 11 are exposed to output the panchromatic original image and the color original image, the first exposure time of the panchromatic pixels could be controlled by the first exposure control line and the second exposure time of the color pixels could be controlled by the second exposure control line. In this way, when the ambient luminance is higher (for example, higher than or equal to the first predetermined luminance), the first exposure time is set to be shorter than the second exposure time. This could prevent the panchromatic pixels from being over saturated and thus avoid the issue of incorrectly using the panchromatic original image to revise the luminance of the color original image.

Please refer to FIG. 42. A mobile terminal 90 is disclosed. The mobile terminal 90 could be a cell phone, a tablet, a laptop, a smart wearable device (such as a smart watch, a smart wristband, smart glasses or a smart helmet), a head mounted display, a virtual reality device, etc. These all fall within the scope of the present disclosure. The mobile terminal 90 comprises an image sensor 10, a processor 60, a memory 70 and a shell 80. The image sensor 10, the processor 60 and the memory 70 are installed inside the shell 80. Here, the image sensor 10 is connected to the processor 60. The processor 60 could perform the same function of the above-mentioned processing chip 20 in the camera component 40 (shown in FIG. 23). In other words, the processor 60 could achieve the functions that the processing chip 20 of any one of the above-mentioned embodiments could achieve. The memory 70 is connected to the processor 60. The memory 70 could store the data generated by the processor 60, such as the target image. The processor 60 and the image sensor 10 could be installed on the same substrate. In this case, the image sensor 10 and the processor 60 could be regarded as a camera component 40. In another embodiment, the processor 60 and the image sensor 10 could be installed in different substrates.

According to an embodiment, the mobile terminal 90 adopts the image sensor 10, which could obtain the phase information in the horizontal direction and the vertical direction. Accordingly, the image sensor 10 could be used in an event having a number of single-color horizontal stripes or an event having a big number of single-color vertical stripes. This raises the adaptability and the accuracy of the phase detection auto focus of the mobile terminal 90.

In the description of this specification, the description of the terms "one embodiment", "some embodiments", "examples", "specific examples", or "some examples", and the like, means to refer to the specific feature, structure, material or characteristic described in connection with the embodiments or examples being included in at least one embodiment or example of the present disclosure. In the present specification, the term of the above schematic representation is not necessary for the same embodiment or example. Furthermore, the specific feature, structure, material, or characteristic described may be in combination in a suitable manner in any one or more of the embodiments or examples.

In addition, it will be apparent to those skilled in the art that different embodiments or examples described in this specification, as well as features of different embodiments or examples, may be combined without contradictory circumstances.

Any process or method described in the flowchart or otherwise described herein may be understood to include one or more modules, fragments, or portions of code of an executable instruction to implement a particular logical function or process.

In addition, the scope of at least one embodiment of the present disclosure includes additional implementations in which the functions may be performed in a sequence that is not shown or discussed, including in a substantially simultaneous manner or in the reverse order depending on the function involved, which is understood by those skilled in the art to which this present disclosure pertains.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. An image sensor, comprising:
a two-dimensional pixel array, comprising a plurality of pixels, wherein at least a part of the pixels comprise two sub-pixels, a rectangular coordinate is established by taking the pixel as an origin, a length direction of the two-dimensional pixel array as an x-axis, and a width direction of the two-dimensional pixel array as a y-axis, the two sub-pixels lie in both a positive half axis and a negative half axis of the x-axis and lie in both a positive half axis and a negative half axis of the y-axis; and
a lens array, comprising a plurality of lenses, each covering one of the pixels
wherein the two-dimensional pixel array comprises a smallest repeating unit, and the smallest repeating unit comprise a plurality of panchromatic pixels and a plurality of color pixels.

2. The image sensor of claim 1, wherein a shape of a cross section of one of the sub-pixels is a trapezoid having a top longer than a bottom and a shape of a cross section of another one of the sub-pixels is a trapezoid having a bottom longer than a top.

3. The image sensor of claim 1, wherein cross sections of the two sub-pixels are both in a triangle shape, or a cross section of one of the sub-pixels is in a shape of reversed L and a cross section of another one of the sub-pixels is in a shape of a mirrored L.

4. The image sensor of claim 1, wherein and the color pixels have a spectral response narrower than a spectral response of the panchromatic pixels.

5. The image sensor of claim 4, wherein the panchromatic pixels are positioned in a first diagonal direction and the color pixels are positioned in a second diagonal direction in the smallest repeating unit; and the first diagonal direction and the second diagonal direction are different.

6. The image sensor of claim 5, wherein at least two adjacent panchromatic pixels of the plurality of panchromatic pixels in the first diagonal direction have a first exposure time controlled by a first exposure signal, and at least two adjacent color pixels of the plurality of color pixels in the second diagonal direction have a second exposure time controlled by a second exposure signal, where the first exposure time is shorter than the second exposure time, and wherein a ratio of the first exposure time to the second exposure time is ½, ⅓ or ¼.

7. The image sensor of claim 5, wherein the smallest repeating unit comprises 16 pixels having 4 rows and 4 columns and is distributed as:

$$\begin{array}{cccc} W & A & W & B \\ A & W & B & W \\ W & B & W & C \\ B & W & C & W \end{array}$$

where W represents the panchromatic pixel, A represents a first color pixel of the plurality of color pixels, B represents a second color pixel of the plurality of color pixel, and C represents a third color pixel of the plurality of color pixels.

8. The image sensor of claim 5, wherein the smallest repeating unit comprises 16 pixels having 4 rows and 4 columns and is distributed as:

$$\begin{array}{cccc} A & W & B & W \\ W & A & W & B \\ B & W & C & W \\ W & B & W & C \end{array}$$

where W represents the panchromatic pixel, A represents a first color pixel of the plurality of color pixels, B represents a second color pixel of the plurality of color pixel, and C represents a third color pixel of the plurality of color pixels.

9. The image sensor of claim 7, wherein the first color pixel A is a red pixel R, the second color pixel B is a green pixel G and the third color pixel C is a blue pixel Bu; or
wherein the first color pixel A is a red pixel R, the second color pixel B is a yellow pixel Y and the third color pixel C is a blue pixel Bu, or the first color pixel A is a magenta pixel M, the second color pixel B is a cyan-blue pixel Cy and the third color pixel C is a yellow pixel Y.

10. A control method, used in an image sensor, the image sensor comprising a two-dimensional pixel array and a lens array, the two-dimensional pixel array comprising a plurality of pixels, wherein at least a part of the pixels comprise two sub-pixels, a rectangular coordinate is established by taking the pixel as an origin, a length direction of the two-dimensional pixel array as an x-axis, and a width direction of the two-dimensional pixel array as a y-axis, the two sub-pixels lie in both a positive half axis and a negative half axis of the x-axis and lie in both a positive half axis and a negative half axis of the y-axis; wherein the lens array comprises a plurality of lenses, each covering one of the pixels; the control method comprising:
exposing the sub-pixels to output sub-pixel information;
calculating a phase difference according to the sub-pixel information to perform a focus process; and
in an in-focus condition, exposing the plurality of pixels in the two-dimensional pixel array to obtain a target image,
wherein the two-dimensional pixel array comprises a smallest repeating unit, and the smallest repeating unit comprise a plurality of panchromatic pixels and a plurality of color pixels.

11. A camera component, comprising:
a lens; and
an image sensor capable of receiving light passing through the lens, the image sensor comprising:
a two-dimensional pixel array, comprising a plurality of pixels, wherein at least a part of the pixels comprise two sub-pixels, a rectangular coordinate is established by taking the pixel as an origin, a length direction of the two-dimensional pixel array as an x-axis, and a width direction of the two-dimensional pixel array as a y-axis, the two sub-pixels lie in both a positive half axis and a negative half axis of the x-axis and lie in both a positive half axis and a negative half axis of the y-axis; and
a lens array, comprising a plurality of lenses, each covering one of the pixels,
wherein the two-dimensional pixel array comprises a smallest repeating unit, and the smallest repeating unit comprise a plurality of panchromatic pixels and a plurality of color pixels.

12. The camera component of claim 11, wherein the sub-pixels are exposed to output sub-pixel information; and the camera component further comprising:
a processing chip, configured to calculate a phase difference according to the sub-pixel information to perform a focus process; and
wherein the plurality of pixels in the two-dimensional pixel array are exposed to obtain a target image in an in-focus condition.

13. The camera component of claim 12, wherein the color pixels have a spectral response narrower than a spectral response of the panchromatic pixels; one of the color pixels comprises two said sub-pixels and one of the panchromatic pixels comprises two said sub-pixels; and the processing chip is further configured to obtain an ambient luminance;
wherein under a condition that the ambient luminance is lower than a first predetermined luminance, the sub-pixels of the panchromatic pixels are exposed to output panchromatic sub-pixel information; and the processing chip is further configured to calculate the phase difference according to the panchromatic sub-pixel information to perform the focus process.

14. The camera component of claim 12, wherein the color pixels have a spectral response narrower than a spectral response of the panchromatic pixels; one of the color pixels comprises two said sub-pixels and one of the panchromatic pixels comprises two said sub-pixels; and the processing chip is further configured to obtain an ambient luminance;
wherein under a condition that the ambient luminance is higher than a second predetermined luminance, the sub-pixels of the color pixels are exposed to output color sub-pixel information; and the processing chip is further configured to calculate the phase difference according to the color sub-pixel information to perform the focus process.

15. The camera component of claim 12, wherein the color pixels have a spectral response narrower than a spectral response of the panchromatic pixels; one of the color pixels comprises two said sub-pixels and one of the panchromatic pixels comprises two said sub-pixels; and the processing chip is further configured to obtain an ambient luminance;
wherein under a condition that the ambient luminance is higher than a first predetermined luminance but lower than a second predetermined luminance, the sub-pixels of the panchromatic pixels are exposed to output panchromatic sub-pixel information and sub-pixels of the color pixels are exposed to output color sub-pixel information; and the processing chip is further configured to calculate the phase difference according to at least one of the panchromatic sub-pixel information and the color sub-pixel information to perform the focus process.

16. The camera component of claim 13, wherein one of the panchromatic pixels comprises two panchromatic sub-pixels; the panchromatic sub-pixel information comprises a first panchromatic sub-pixel information and a second panchromatic sub-pixel information; the first panchromatic sub-pixel information and the second panchromatic sub-pixel information are respectively outputted by the panchromatic sub-pixel located in a first position of the lens and the panchromatic sub-pixel located in a second position of the lens; the first panchromatic sub-pixel information and the second panchromatic sub-pixel information work as a panchromatic sub-pixel information pair; and the processing chip is further configured to:
  generate a first curve according to the first panchromatic sub-pixel information of a plurality of panchromatic sub-pixel information pairs;
  generate a second curve according to the second panchromatic sub-pixel information of the plurality of panchromatic sub-pixel information pairs; and
  calculate the phase difference according to the first curve and the second curve to perform the focus process.

17. The camera component of claim 14, wherein one of the color pixels comprises two color sub-pixels; the color sub-pixel information comprises a first color sub-pixel information and a second color sub-pixel information; the first color sub-pixel information and the second color sub-pixel information are respectively outputted by the color sub-pixel located in a first position of the lens and the color sub-pixel located in a second position of the lens; the first color sub-pixel information and the second color sub-pixel information work as a color sub-pixel information pair; and the processing chip is further configured to:
  generate a third curve according to the first color sub-pixel information of each of color sub-pixel information pairs;
  generate a fourth curve according to the second color sub-pixel information of each of the plurality of color sub-pixel information pairs; and
  calculate the phase difference according to the third curve and the fourth curve to perform the focus process.

18. The camera component of claim 15, wherein one of the panchromatic pixels comprises two panchromatic sub-pixels; the panchromatic sub-pixel information comprises a first panchromatic sub-pixel information and a second panchromatic sub-pixel information; the first panchromatic sub-pixel information and the second panchromatic sub-pixel information are respectively outputted by the panchromatic sub-pixel located in a first position of the lens and the panchromatic sub-pixel located in a second position of the lens; the first panchromatic sub-pixel information and the second panchromatic sub-pixel information work as a panchromatic sub-pixel information pair; one of the color pixels comprises two color sub-pixels; the color sub-pixel information comprises a first color sub-pixel information and a second color sub-pixel information; the first color sub-pixel information and the second color sub-pixel information are respectively outputted by the color sub-pixel located in a first position of the lens and the color sub-pixel located in a second position of the lens; the first color sub-pixel information and the second color sub-pixel information work as a color sub-pixel information pair; and the processing chip is further configured to:
  generate a first curve according to the first panchromatic sub-pixel information of a plurality of panchromatic sub-pixel information pairs;
  generate a second curve according to the second panchromatic sub-pixel information of the plurality of panchromatic sub-pixel information pairs;
  generate a third curve according to the first color sub-pixel information of a plurality of color sub-pixel information pairs;
  generate a fourth curve according to the second color sub-pixel information of the plurality of color sub-pixel information pairs; and
  calculate the phase difference according to the first curve, the second curve, the third curve and the fourth curve to perform the focus process.

19. The camera component of claim 12, wherein the color pixels have a spectral response narrower than a spectral response of the panchromatic pixels; the smallest repeating unit comprises a plurality of sub-units, each of the sub-units comprises a plurality of single-color pixels and a plurality of panchromatic pixels; the pixels in the two-dimensional pixel array are exposed to output a panchromatic original image and a color original image; and the processing chip is further configured to:
  perform an interpolation on the panchromatic original image to obtain pixel information of all of the pixels of each of the sub-units such that a panchromatic intermediate image is obtained;
  perform an interpolation on the color original image to obtain a color intermediate image, wherein the corresponding sub-pixels in the color intermediate image are arranged in a Bayer pattern; and
  combine the panchromatic intermediate image with the color intermediate image to obtain a target image.

20. The camera component of claim 12, wherein the color pixels have a spectral response narrower than a spectral response of the panchromatic pixels; the smallest repeating unit comprises a plurality of sub-units, each of the sub-units comprises a plurality of single-color pixels and a plurality of panchromatic pixels; the pixels in the two-dimensional pixel array are exposed to output a panchromatic original image and a color original image; and the processing chip is further configured to:
  process the panchromatic original image to take all of the pixels of each of the sub-units as a panchromatic big pixel and output pixel information of the panchromatic big pixel such that the panchromatic intermediate image is obtained;
  process the color original image to take all of the pixels of each of the sub-units as a single-color big pixel corresponding to a single color of the sub-pixel and output pixel information of the single-color big pixel to obtain a color intermediate image; and
  combine the panchromatic intermediate image with the color intermediate image to obtain a target image.

* * * * *